United States Patent
Sakamoto et al.

(10) Patent No.: US 8,476,341 B2
(45) Date of Patent: Jul. 2, 2013

(54) MULTI-BRANCHED POLYALKYLENE GLYCOL POLYMER, METHOD FOR PRODUCING THE SAME, AND ADMIXTURE FOR CEMENT

(75) Inventors: Noboru Sakamoto, Suita (JP); Tsutomu Yuasa, Suita (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 13/063,300

(22) PCT Filed: Sep. 8, 2009

(86) PCT No.: PCT/JP2009/065689
§ 371 (c)(1),
(2), (4) Date: Mar. 10, 2011

(87) PCT Pub. No.: WO2010/029924
PCT Pub. Date: Mar. 18, 2010

(65) Prior Publication Data
US 2011/0160393 A1    Jun. 30, 2011

(30) Foreign Application Priority Data

Sep. 11, 2008 (JP) ................................. 2008-233044
Sep. 11, 2008 (JP) ................................. 2008-233045
Sep. 19, 2008 (JP) ................................. 2008-241574

(51) Int. Cl.
*C04B 16/04* (2006.01)
*C08F 283/06* (2006.01)

(52) U.S. Cl.
USPC ............................................. 524/5; 526/209

(58) Field of Classification Search
USPC ............................................. 524/5; 526/209
See application file for complete search history.

(56) References Cited

U.S. PATENT DOCUMENTS

| 2002/0193547 A1 | 12/2002 | Yuasa et al. |
| 2003/0125492 A1 | 7/2003 | Yamamoto et al. |
| 2004/0138362 A1 | 7/2004 | Kim |
| 2006/0229388 A1 | 10/2006 | Kawakami et al. |

(Continued)

FOREIGN PATENT DOCUMENTS

| CN | 1939868 A | 4/2007 |
| EP | 1767505 A2 | 3/2007 |

(Continued)

OTHER PUBLICATIONS

Machine translation of JP 07-109487. Apr. 1995.*

*Primary Examiner* — John Uselding
(74) *Attorney, Agent, or Firm* — Novak Druce Connolly Bove + Quigg LLP

(57) ABSTRACT

The present invention provides a multi-branched polyalkylene glycol polymer useful for various applications, especially for an admixture for cement, a dispersant, admixture for cement, and cement composition each comprising the same, a thiol compound having a polyalkylene glycol chain useful for materials and the like of the polymer, and a method for easily and effectively producing the multi-branched polyalkylene glycol polymer and the thiol compound having a polyalkylene glycol chain at low cost. The multi-branched polymer comprises: a polyalkylene glycol chain; a residue of a compound having three or more active hydrogen atoms; and a polymer portion having a constitutional unit derived from a vinyl monomer component, one end of the polyalkylene glycol chain bonding to the residue, and a terminal oxygen atom of at least one of the other ends of the polyalkylene glycol chain bonding to a main chain end of the polymer portion directly or via an organic residue.

17 Claims, 1 Drawing Sheet

U.S. PATENT DOCUMENTS

| | | |
|---|---|---|
| 2007/0073022 A1 | 3/2007 | Yuasa et al. |
| 2010/0105810 A1 | 4/2010 | Sakamoto et al. |
| 2011/0021668 A1 | 1/2011 | Hamai et al. |
| 2011/0046269 A1 | 2/2011 | Yuasa et al. |

FOREIGN PATENT DOCUMENTS

| | | |
|---|---|---|
| JP | 7013141 | 2/1995 |
| JP | 7-109487 | 4/1995 |
| JP | 2001-220417 | 8/2001 |
| JP | 2002128889 | 5/2002 |
| JP | 2005-185990 | 7/2005 |
| JP | 2007-119736 | 5/2007 |
| JP | 2007-238387 | 9/2007 |
| JP | 2008-266619 | 11/2008 |
| JP | 2009-256202 | 11/2009 |

\* cited by examiner

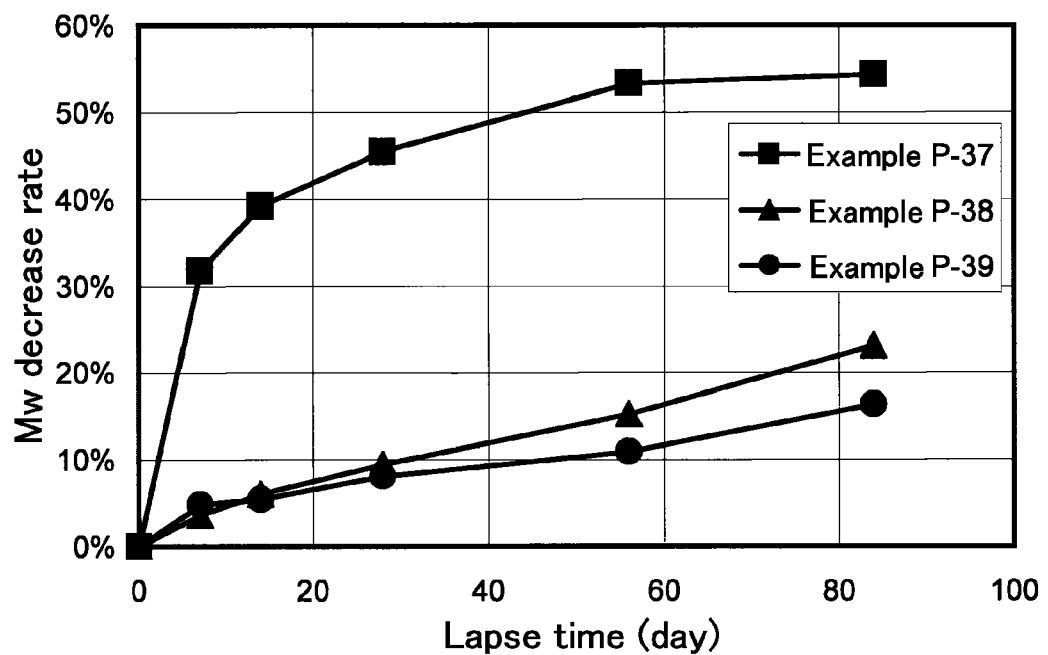

MULTI-BRANCHED POLYALKYLENE GLYCOL POLYMER, METHOD FOR PRODUCING THE SAME, AND ADMIXTURE FOR CEMENT

CROSS REFERENCE TO RELATED APPLICATIONS

This application is a National Phase filing under 35 U.S.C. §371 of PCT/JP2009/065689 filed on Sep. 8, 2009; and this application claims priority to Application No. 2008233044 filed in Japan on Sep. 11, 2008 under 35 U.S.C. §119, and this application claims priority to Application No. 2008233045 filed in Japan on Sep. 11, 2008 under 35 U.S.C. §119, and this application claims priority to Application No. 2008241574 filed in Japan on Sep. 19, 2008 under 35 U.S.C. §119; the entire contents of all are hereby incorporated by reference.

FIELD OF THE INVENTION

The present invention relates to a multi-branched polyalkylene glycol polymer, a thiol compound having a polyalkylene glycol chain, a dispersant, an admixture for cement, and a cement composition. The present invention specifically relates to a multi-branched polyalkylene glycol polymer used for various applications including an admixture for cement; a thiol compound having a polyalkylene glycol chain suitable for materials and the like thereof; a dispersant including the multi-branched polyalkylene glycol polymer; an admixture for cement; and a method for producing a cement composition.

BACKGROUND ART

Polymers each having a polyalkylene glycol chain are imparted various properties such as hydrophilicity, hydrophobicity, and steric repulsion by adjusting their chain lengths and selecting alkylene oxides forming the polymers. These polymers are used as soft segments in various applications such as adhesives and sealants, flexibility-imparting components, and detergent builders.

In recent years, these polymers have been tentatively used as admixtures for cement which are added to cement compositions such as cement pastes, mortar, and concrete. Such admixtures for cement are generally used as agents such as water-reducing agents that increase the fluidity of cement compositions and reduce the amount of water in the cement compositions so that cured products of the cement compositions are capable of having improved properties such as strength and durability. Conventionally used water-reducing agents are naphthalene-based water-reducing agents; currently, polycarboxylic water-reducing agents having polyalkylene glycol chains are newly proposed as those having high water-reducing ability because the polyalkylene glycol chains serve as dispersing groups for dispersing cement particles owing to their steric repulsion. As a result, such water-reducing agents are widely used as high-performance AE water-reducing agents at the present time.

There is disclosed a copolymer for an admixture for cement that is obtained by copolymerizing an unsaturated carboxylic monomer and an unsaturated polyalkylene glycol ether monomer (for example, see Patent Document 1). In this copolymer for an admixture for cement, a carboxyl group derived from the unsaturated carboxylic monomer serves as an adsorbing group that adsorbs cement particles, while a polyalkylene glycol chain derived from the unsaturated polyalkylene glycol ether monomer serves as a dispersing group that disperses cement particles. The steric repulsion of this polyalkylene glycol chain gives reasonably high dispersibility to an admixture for cement. In order to further reduce the amount of an admixture for cement, however, an admixture for cement with higher dispersibility is demanded.

Incidentally, thiol compounds that are compounds each having one or more mercapto groups (thiol groups, SH groups) is used in various applications utilizing the specific reactivity of the mercapto group. For example, high-molecular-weight thiol compounds that are obtained by introducing mercapto groups into polyether compounds are focused on as those widen the range of the applicable fields of the conventional polyether compounds, such as (poly)alkylene glycol, suitable as soft segments for adhesives and sealants, and components for imparting flexibility to various polymers.

Examples of the thiol compound prepared by introducing a mercapto group into a conventional polyether compound include: a polyether having a mercapto group(s) at either end or both ends obtained by adding a thio carboxylic acid to a polyether having a double bond(s) at either end or both ends and then decomposing a generated thioester group(s) (see Patent Document 2); and a polymer obtained by block- or graft-polymerizing a monoethylenic unsaturated monomer component to a modified polyether compound in which a mercapto group-containing compound is introduced into a polyether compound by esterification reaction as a biodegradable water-soluble polymer used as a detergent builder (see Patent Document 3). In addition, there is disclosed that a polyalkylene glycol chain-containing polymer obtained by using a thiol compound as a polymeric chain transfer agent based on the property that hydrogen is easily extracted from a mercapto group and a radical is generated to serve as a polymerization-starting point is suitably used as an admixture for cement and the like (see Patent Document 4). Further, Aldrich Corporation markets Poly(ethylene oxide), 4-arm, thiol terminated (product No. 565725, see Non-Patent Document 1), and Pentaerythritol tetrakis(3-mercaptopropionate) Pentaerythritol tetrakis(3-mercaptopropionate) (product No. 381462, see Non-Patent Document 2) as polythiols free from a polyethylene glycol chain.

However, the conventional polyether compounds and thiol compounds produced by introducing mercapto groups thereinto have room for sufficiently higher dispersibility (water-reducing ability) currently desired and for being more useful compounds in more fields. In addition, there is room for easier, more efficient, and less expensive methods for producing compounds having such extremely high cement dispersibility.

Patent Document 1: JP-A 2001-220417
Patent Document 2: JP-B 7-13141
Patent Document 3: JP-A 7-109487
Patent Document 4: JP-A 2007-119736
Non-Patent Document 1: Aldrich advancing Science 2007-2008 Japan, Sigma-Aldrich Japan, page 2032, upper left column
Non-Patent Document 2: "Pentaerythritol tetrakis(3-mercaptopropionate)", [online], 2007, Sigma-Aldrich Japan, [searched on Sep. 5, 2008], Internet <URL: http://www.sigmaaldrich.com/catalog/search/ProductDetail/ALDRICH/381462>

SUMMARY OF THE INVENTION

The present invention is devised based on the aforementioned conditions. An object of the present invention is to provide a multi-branched polyalkylene glycol polymer that is useful for various applications, especially for an admixture for cement; a dispersant, an admixture for cement, and a cement composition each including the polymer; a polyalkylene glycol chain-containing thiol compound that is useful for materials and the like of the polymer; and methods for easily and effectively producing the multi-branched polyalkylene glycol polymer and the polyalkylene glycol chain-containing thiol compound at low cost.

The present inventors have performed various studies on the polyalkylene glycol chain-containing polymer, and have focused on the fact that, if having a multi-branched structure, such a polymer gives a high water-reducing ability to a cement composition and the like owing to its steric repulsion. As a result, the present inventors have found that:

an admixture for cement may be allowed to have excellent dispersibility in the case that the polymer has a structure in which one end of the polyalkylene glycol chain bonds to a residue of a compound having three or more active hydrogen atoms and an terminal oxygen atom of at least one of the other ends of the chain bonds to a main chain end of a polymer portion having a structural unit derived from a vinyl monomer component via an organic residue, and this polymer is a novel compound that has not been known ever before;

this polymer is useful in more fields;

a polymer obtained by polymerizing vinyl monomer components in the presence of a polyalkylene glycol chain-containing compound that bonds to a residue of a compound having three or more active hydrogen atoms and to an organic residue is also a novel compound that is capable of showing excellent dispersibility; and such a production method is industrially very useful method.

The present inventors have further found that, among these polymers, the polymer in which the organic residue between the terminal oxygen atom of the polyalkylene glycol chain and the main chain end of the polymer portion is a sulfur-containing group is effectively and easily produced at low cost, and more sufficiently shows the effect of showing excellent dispersibility. Such a polymer is obtained by polymerizing vinyl monomer components in the presence of a compound having a polyalkylene glycol chain that bonds to a residue of a compound having three or more active hydrogen atoms and to a sulfur-containing organic residue. The structure of this polymer is probably obtained as follows: a radical generated from a mercapto group in the polymer by factors such as heat, light, and radiation, or a radical generated by a polymerization initiator that is separately used as required, chain-transfers to the mercapto group or, if the mercapto groups bond to each other to form a disulfide bond, the radical cleaves the disulfide bond and the monomers are consecutively attached thereto via the sulfur atom (S). Thus, the present inventors have found that an admixture for cement including the polymer of the present invention shows better dispersibility than ever before, and that a cement composition containing this admixture is useful in the field of cement.

The present inventors have also performed various studies on the thiol compound, and focused on the fact that a compound having a polyalkylene glycol chain and a mercapto group provides a water-reducing ability to a cement composition and the like. Thus, the present inventors have found that:

in the case of having a structure in which one end of the polyalkylene glycol chain bonds to a residue of a compound having three or more active hydrogen atoms and at least one of the other ends thereof bonds to the mercapto group via a carbonyl group-containing group, the compound provides an admixture for cement that shows extremely excellent dispersibility, and the compound is a novel compound that has not been known;

this compound is useful in more fields;

this compound is easily and effectively produced at low cost without complicated steps by employing a method including the step of dehydration-condensing a compound formed by adding an alkylene oxide to a compound having three or more active hydrogen atoms and a carboxyl group-containing thiol compound; and this method is an industrially useful method. As a result, the present inventors have arrived at the fact that the above compound and method solve the aforementioned problems.

The present inventors have furthermore found that:

such a thiol compound is imparted extremely excellent hydrolysis resistance and more sufficiently shows the effects derived from the structure of the compound in various applications in the case of satisfying (II-1) at least one terminal unit of the (poly)alkylene glycol chain on the side of the carbonyl group-containing group is substituted by an oxyalkylene group having three or more carbon atoms, or (II-2) the carbonyl group-containing group is substituted by a group having a carbonyl group and a tertiary or quaternary carbon atom bonded to the carbonyl group;

such a polyalkylene glycol chain-containing thiol compound is easily and effectively produced at low cost without complicated steps by employing a method including the step of dehydration-condensing a compound formed by adding an alkylene oxide to the compound having three or more active hydrogen atoms and a carboxyl group-containing thiol compound;

this method is an industrially useful method;

a polymer produced from such a polyalkylene glycol chain-containing thiol compound shows hydrolysis resistance owing to its specific structure and stably shows high dispersibility for a long time;

in particular, the polymer shows excellent cement dispersibility;

an admixture for cement including such a polymer greatly reduces the amount thereof upon preparing a cement composition, and thus is extremely useful in fields using concrete such as the civil engineering and construction fields. Thereby, the present inventors have made the present invention.

The present invention relates to the following embodiments (1) to (7).

(1) A multi-branched polymer comprising:

a polyalkylene glycol chain;

a residue of a compound having three or more active hydrogen atoms; and a polymer portion having a constitutional unit derived from a vinyl monomer component, one end of the polyalkylene glycol chain bonding to the residue, and a terminal oxygen atom of at least one of the other ends of the polyalkylene glycol chain bonding to a main chain end of the polymer portion directly or via an organic residue.

(2) A method for producing the multi-branched polyalkylene glycol polymer, comprising:

polymerizing vinyl monomer components in the presence of a compound having a polyalkylene glycol chain represented by formula (3):

[Chem. 1]

$$X\!\!-\!\!\left[(AO)_n\!-\!Y^1\!-\!H\right]_m \quad (3)$$

wherein X is a residue of a compound having three or more active hydrogen atoms; each AO is a C2-C18 oxyalkylene group, and the AOs may be the same as or different from each other; each $Y^1$ is a direct bond or an organic residue;

each n is an average number of moles of oxyalkylene groups added and is 5 to 1,000, and the ns may be the same as or different from each other; and m is an integer of 1 to 50.

(3) A thiol compound comprising:
a polyalkylene glycol chain;
a residue of a compound having three or more active hydrogen atoms;
a group having a carbonyl group; and
a mercapto group,
one end of the polyalkylene glycol chain bonding to the residue, and
at least one of the other ends of the polyalkylene glycol chain bonding to the mercapto group via the group having a carbonyl group.

(4) A method for producing the thiol compound having a polyalkylene glycol chain, comprising the step of:
dehydration-condensing a compound formed by adding an alkylene oxide to a compound having three or more active hydrogen atoms and a thiol compound having a carboxyl group.

(5) A dispersant comprising the aforementioned multi-branched polyalkylene glycol polymer.

(6) An admixture for cement comprising the aforementioned multi-branched polyalkylene glycol polymer.

(7) A cement composition comprising the aforementioned multi-branched polyalkylene glycol polymer.

The following will describe the present invention in detail.

<Multi-Branched Polyalkylene Glycol Polymer>

The multi-branched polyalkylene glycol polymer of the present invention includes a polyalkylene glycol chain, a residue of a compound having three or more active hydrogen atoms and a polymer portion having a constitutional unit derived from a vinyl monomer component, wherein one end of the polyalkylene glycol chain bonds to the residue and a terminal oxygen atom of at least one of the other ends thereof bonds to a main chain end of the polymer portion directly or via an organic residue.

Hereinafter, the multi-branched polyalkylene glycol polymer of the present invention is also referred to as the "polymer (i)", and the polymer portion having a constitutional unit derived from a vinyl monomer component to which the polyalkylene glycol chain bonds directly or via an organic residue, which is a part of the polymer (i), is also referred to as the "polymer (ii)". The aforementioned polyalkylene glycol chain (the polyalkylene glycol chain that bonds to the residue of the compound having three or more active hydrogen atoms and the organic residue) is also referred to as the "polyalkylene glycol chain (1)".

The polymer (i) has a multi-branched structure. The term "multi-branched structure" used herein means that the polymer has branches radiating out from the residue of the compound having three or more active hydrogen atoms. In other words, the term means the structure in which the residue of the compound having three or more active hydrogen atoms and the polymer (ii) are coupled via the polyalkylene glycol chain (1) or the polyalkylene glycol chain (1) and the organic residue. Such a polymer having a multi-branched structure of the present invention is particularly excellent in cement dispersibility and has the possibility of being used in various applications because it is a novel polymer.

In the polymer (i), the residue of the compound having active hydrogen is a group formed by removing an active hydrogen atom from a compound having active hydrogen atoms. The active hydrogen is a kind of hydrogen to which an alkylene oxide is to be added. One species of such a residue of the compound having three or more active hydrogen atoms may be used, or two or more species thereof may be used.

An appropriate number of the active hydrogen atoms in the compound having active hydrogen atoms is three or more for good industrial production efficiency, and is 50 or less for good polymerizability upon polymerization with the polyalkylene glycol chain-containing thiol compound. The lower limit of the number of the active hydrogen atoms is preferably 4, and more preferably 5. The upper limit thereof is more preferably 20, and further preferably 10.

Preferable examples of the residue of the compound having three or more active hydrogen atoms specifically include: polyhydric alcohol residues formed by removing active hydrogen atoms from hydroxy groups of polyhydric alcohols; polyamine residues formed by removing active hydrogen atoms from amino groups of polyamines; polyimine residues formed by removing active hydrogen atoms from imino groups of polyimines; and polyamide residues formed by removing active hydrogen atoms from amido groups of polyamides. Particularly preferable among these are polyamine residues, polyalkyleneimine residues, and polyhydric alcohol residues. In other words, the residue of the compound having three or more active hydrogen atoms is preferably at least one polycompound residue selected from the group consisting of polyamine residues, polyalkyleneimine residues, and polyhydric alcohol residues. Such residues provide compounds suitable for various applications.

Here, the residue of the compound having active hydrogen atoms may have a chain structure, a branched structure, or a three-dimensionally cross-linked structure.

The polyamine among the preferable residues of compounds having active hydrogen atoms is not particularly limited as long as it is a compound having three or more amino groups per molecule on average. Appropriate examples thereof include homopolymers and copolymers obtained by polymerizing, by a usual method, one or more species of monoamine compounds such as alkyl amines e.g. methyl amine, ethyl amine, propyl amine, butyl amine, 2-ethylbutyl amine, octyl amine, dimethyl amine, dipropyl amine, dimethyl ethanol amine, dibutyl amine, trimethyl amine, triethyl amine, cyclobutyl amine, cyclohexyl amine, and lauryl amine; alkylene amines e.g. allyl amine; aromatic amines e.g. aniline and dipheyl amine; and nitrogen compounds e.g. ammonia, urea, and thiourea. Such a compound forms a polyamine residue in the polyalkylene glycol chain-containing thiol compound. In addition, examples thereof further include ethylene diamine, diethylene triamine, triethylene tetramine, tetraethylene pentamine, pentaethylene hexamine, dipropylene triamine, tripropylene tetramine, and tetrapropylene pentamine. These polyamines each usually have a primary amino group and a secondary amino group (imino group) each having an active hydrogen atom in addition to a tertiary amino group in the structure. Preferable among these are polyalkyl amines.

Preferable examples of alkyl amines forming the polyalkyl amines include C8-C18 alkyl amines such as lauryl amine.

The polyalkylene imine is not particularly limited as long as it is a compound having three or more imino groups per molecule on average. Preferable examples thereof include homopolymers and copolymers obtained by polymerizing, by a usual method, one or more species of C2-C8 alkylene imines such as ethylene imine, propylene imine, 1,2-butylene imine, 2,3-butylene imine, and 1,1-dimethylethylene imine. Such a compound forms a polyalkylene imine residue in the polyalkylene glycol chain-containing thiol compound. Here, the polyalkylene imine is three-dimensionally cross-linked by the polymerization and usually has a primary amino group and a secondary amino group (imino group) each having an active hydrogen atom in addition to a tertiary amino group in its structure.

More preferable among these are polyalkylene imines in which ethylene imine is a main component for good performance of the polyalkylene glycol chain-containing thiol compound.

The "main component" herein means the alkylene imine that occupies a large part of the number of all the alkylene imines in the polyalkylene imine formed by two or more alkylene imines. In the present invention, the polyalkylene glycol chain-containing thiol compound is imparted an improved hydrophilicity and to be sufficiently suitable for various applications if ethylene imine occupies a large part of the alkylene imines forming the polyalkylene imine chain. Thus, the phrase "occupies a large part" herein means that ethylene imine is used as an alkylene imine forming the polyalkylene imine chain (polyalkylene imine residue) to the extent that the above effect is sufficiently achieved. The amount in mol % of the ethylene imine "occupying a large part" for 100 mol % of all the alkylene imines is preferably 50 to 100 mol %. If the amount in mol % is lower than 50 mol %, the polyalkylene imine chain may have insufficient hydrophilicity. The amount is more preferably 60 mol % or higher, further preferably 70 mol % or higher, particularly preferably 80 mol % or higher, and most preferably 90 mol % or higher.

The average number of polymerized alkylene imines per polyalkylene imine chain is preferably 2 or more and 300 or less. An average number thereof in such a range allows more sufficient achievement of the effects owing to the structure of the polyalkylene glycol chain-containing thiol compound. For example, the compound shows cement dispersibility and is suitably used in applications such as an admixture for cement. The lower limit of the number is more preferably 3, further preferably 5, and particularly preferably 10. The upper limit thereof is more preferably 200, further preferably 100, particularly preferably 50, and most preferably 25. The average number of polymerized diethylene triamine is 2, and the average number of polymerized triethylene tetramine is 3.

The polyamine and polyalkylene imine each preferably have a number average molecular weight of 100 to 100,000, more preferably 300 to 50,000, further preferably 600 to 10,000, and particularly preferably 800 to 5,000.

The polyhydric alcohol is not limited as long as it is a compound having three or more hydroxy groups per molecule on average. It is preferably a compound consisting of the three elements, namely, carbon, hydrogen, and oxygen. Specific examples thereof include polyglycidol, glycerin, polyglycerin, trimethylol ethane, trimethylol propane, 1,3,5-pentatriol, erythritol, pentaerythritol, dipentaerythritol, sorbitol, sorbitan, a sorbitol-glycerin condensate, adonitol, arabitol, xylitol, and mannitol. Also preferable are saccharides, including: hexoses such as glucose, fructose, mannose, idose, sorbose, gulose, talose, tagatose, galactose, allose, psicose, and altrose; pentoses such as arabinose, ribulose, ribose, xylose, xylulose, and lixose; tetroses such as threose, erythrulose, and erythrose; other saccharides such as rhamnose, cellobiose, maltose, isomaltose, trehalose, sucrose, raffinose, gentnianose, and melezitose; sugar alcohols thereof, and saccharic acids (saccharides; glucose and sugar alcohols; glucitol and saccharic acid; and gluconic acid). Further preferable are derivatives of these exemplified compounds, such as partially etherified products and partially esterified products. Such a compound provides a polyhydric alcohol residue in the polyalkylene glycol chain-containing thiol compound.

More preferable among these are trimethylol propane and sorbitol for good industrial production efficiency.

The residue of the compound having three or more active hydrogen atoms is to bond to two or more polyalkylene glycol chains (1) each bonding to the polymer (ii) directly or via an organic residue. In other words, the appropriate number of the polyalkylene glycol chain (1) to which the compound having three or more active hydrogen atoms bond is 2 or more. In such a case, the polymer (i) of the present invention is to have a multi-branched structure. The number thereof is preferably 3 or more.

The number of the polyalkylene glycol chain (1) to which the compound having three or more active hydrogen atoms bond is preferably the same as the number of active hydrogen atoms in the compound having three or more active hydrogen atoms. In other words, all the active hydrogen atoms in the compound having three or more active hydrogen atoms preferably bond to the polyalkylene glycol chain (1). In such a case, the compound provides an admixture for cement that can show much better dispersibility. As a result, the compound is capable of being used in various applications.

The following will give a schematic structure in which the number of the polyalkylene glycol chains (1) to which the compound having three or more active hydrogen atoms bond is equal to the number of active hydrogen atoms in the compound having three or more active hydrogen atoms.

The following formula (A) gives a schematic structure in which the residue of the compound having three or more active hydrogen atoms is a glycerin residue (polyhydric alcohol residue), and every active hydrogen atom of the glycerin bonds to the polyalkylene glycol chain (1) and, via an organic residue including a sulfur atom, the polymer (ii).

The following formula (B) gives a schematic structure in which the residue of the compound having three or more active hydrogen atoms is a sorbitol residue (polyhydric alcohol residue), and every active hydrogen atom of the glycerin bonds to the polyalkylene glycol chain (1) and, via an organic residue including a sulfur atom, the polymer (ii).

[Chem. 2]

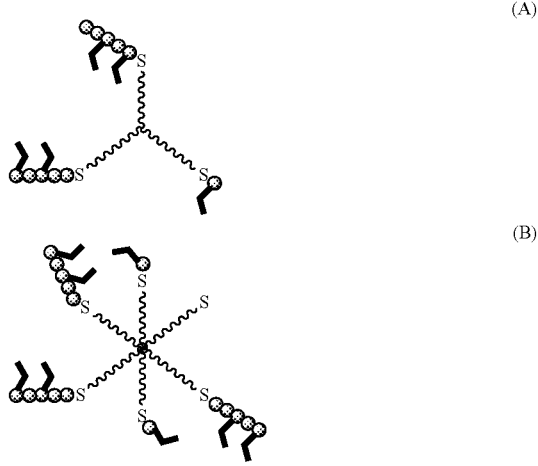

(A)

(B)

In the multi-branched polyalkylene glycol polymer (i), the polyalkylene glycol chain (1) bonds to the residue of the compound having three or more active hydrogen atoms.

The polyalkylene glycol chain (1) is not limited as long as it comprises an alkylene oxide having 2 or more carbon atoms (polyalkylene oxide). Preferable examples of the alkylene oxide include C2-C18 alkylene oxides. More preferable are C2-C8 alkylene oxides. Examples thereof include ethylene oxide, propylene oxide, butylene oxide, isobutylene oxide, 1-butene oxide, 2-butene oxide, trimethylethylene oxide, tetramethylene oxide, tetramethylethylene oxide, butadiene monooxide, and octylene oxide. Examples thereof further include aliphatic epoxides such as dipentaneethylene oxide and dihexaneethylene oxide; alicyclic epoxides such as trimethylene oxide, tetramethylene oxide, tetrahydrofuran, tetrahydropyran, and octylene oxide; and aromatic epoxides such as styrene oxide and 1,1-diphenylethylene oxide.

The alkylene oxide constituting the polyalkylene glycol chain (1) is preferably selected depending on the applications and the like conditions under which the polymer (i) of the present invention is to be used. For example, in the case of being used for producing the component of an admixture for cement, the polymer (i) preferably contains, as a main component, a relatively short chain alkylene oxide (oxyalkylene group) having about 2 to 8 carbon atoms for good affinity for cement particles. The polymer (i) more preferably contains, as a main component, a C2-C4 alkylene oxide such as ethylene oxide, propylene oxide, and butylene oxide, and further preferably ethylene oxide.

The "main component" herein means that such an alkylene oxide occupies a large part of the number of all the alkylene oxides in the polyalkylene glycol chain (1) formed by two or more alkylene oxides. The mol % value of the ethylene oxide "occupying a large part" for 100 mol % of all the alkylene oxides is preferably 50 to 100 mol %. Thereby, the polymer (i) is to have higher hydrophilicity. The value is more preferably 60 mol % or higher, further preferably 70 mol % or higher, particularly preferably 80 mol % or higher, and most preferably 90 mol % or higher.

In the case that the polyalkylene glycol chain (1) comprises two or more species of alkylene oxides, these two or more species of alkylene oxides may be added by any mode of random addition, block addition, alternate addition, or the like. In the case that the polymer (i) comprises multiple polyalkylene glycol chains (1) per molecule, the chains may be the same as or different from each other.

The polyalkylene glycol chain (1) preferably has an oxyalkylene group having three or more carbon atoms because, in the case that the polymer having such a chain is mixed with an admixture for cement to provide a cement composition, this chain leads to reduction in the viscosity and stiffness thereof. Thereby, the polyalkylene glycol chain (1) is imparted a certain degree of hydrophobicity, and gives some structures (networks) to cement particles. In this case, the ratio of the oxyalkylene group having three or more carbon atoms is preferably 1 mol % or higher, more preferably 3 mol % or higher, further preferably 5 mol % or higher, and particularly preferably 7 mol % or higher for 100 mol % of all the oxyalkylene groups (alkylene glycol units) constituting the polyalkylene glycol chain (1). If too many oxyalkylene groups each having three or more carbon atoms are introduced, hydrophobicity is too much increased, and the dispersibility of cement particles is insufficiently increased, for example. Thus, the ratio thereof is preferably 50 mol % or lower, more preferably 30 mol % or lower, further preferably 20 mol % or lower, and particularly preferably 10 mol % or lower.

In some applications for which the polymer (i) is to be used, the chain preferably contains no alkylene oxide having three or more carbon atoms.

Preferable examples of the oxyalkylene group having three or more carbon atoms include C3-C18 oxyalkylene groups because of their easy introducibility, good affinity for cement particles, and the like preferable factors. Particularly preferable among these are C3-C8 oxyalkylene groups, and more preferable are a C3 oxypropylene group, a C4 oxybutylene group, and the like.

The oxyalkylene group having three or more carbon atoms may be introduced in a block state or randomly. It is preferably introduced in a block state as (a (poly)alkylene glycol chain comprising an oxyalkylene group having two or more carbon atoms)—(a (poly)alkylene glycol chain comprising an oxyalkylene group having three or more carbon atoms)—(a (poly)alkylene glycol chain comprising an oxyalkylene group having two or more carbon atoms). Such a structure leads to higher dispersibility.

The average number n of repeated alkylene oxides (the average number of moles of the alkylene oxides added) in the polyalkylene glycol chain (1) is preferably 5 to 1,000. In the case that the average repeating number is 5 or greater, the properties owing to the polyalkylene glycol chain (1) are sufficiently achieved. If n is greater than 1,000, a material compound may be unfavorable one from the viewpoint of workability, such as an increased viscosity and insufficient reactivity. The lower limit of the average repeating number is more preferably 7, and further preferably 10, while the upper limit thereof is more preferably 800 and further preferably 600.

Here, the average number of repeated alkylene oxides (the average number of moles of the oxyalkylene groups added) means an average value of moles of the alkylene oxides added per mole of the polyalkylene glycol chain (1) of the polymer (i).

In the multi-branched polyalkylene glycol polymer (i), a terminal oxygen atom of at least one of the other ends of the polyalkylene glycol chain (1) bonds to the main chain end of the polymer (ii) directly or via an organic residue. In particular, the bonding is preferably achieved via an organic residue.

The organic residue is preferably a group having a molecular weight of 1,000 or less. If the molecular weight is more than 1,000, the group itself is likely to be hydrolyzed, and thereby the polymer (ii) and the polyalkylene glycol chain (1) may not be stably bonded. In addition, introduction of the group may be difficult and cost efficiency may be reduced. The molecular weight is more preferably 500 or less, and is further preferably 300 or less.

The organic residue preferably contains a sulfur atom. Specific examples thereof include $-S-Y^2-COO-$, $-S-Y^2-CO-$, $-S-Y^2-CO-NH-$, $-S-Y^2-CO-NH-CH_2-CH_2-$, $-S-Y^2-$, $-S-Y^2-O-$, $-S-Y^2-N-$, and $-S-Y^2-S-$. Here, $Y^2$ is a bivalent organic residue, and is preferably a C1-C18 straight, branched, or cyclic alkylene group or a C6-C11 aromatic group (such as a phenyl group, an alkyl phenyl group, a pyridinyl group, thiophene, pyrrole, furan, and thiazol). These groups may be partially substituted by a substituent such as a hydroxy group, an amino group, an acetylamino group, a cyano group, a carbonyl group, a carboxyl group, a halogen group, a sulfonyl group, a nitro group, and a formyl group.

In the case that the organic residue contains a sulfur atom as mentioned above, the organic residue preferably bonds to the main chain end of the polymer (ii) via this sulfur atom. As mentioned below, such a structure is advantageous in the production because monomers are consecutively added to another via the sulfur atom owing to the reactivity of the sulfur atom to form the polymer (ii).

Preferable among the organic residues containing a sulfur atom are those containing a carbonyl group ($-C(O)-$) or an amido group ($-N(H)-C(O)-$). The polymer having such a structure in which the organic residue further contains a carbonyl group or an amido group is also one preferable mode of the present invention. The polymer having such a mode is industrially useful because it is easily produced at low cost. In this case, a carbon atom in the carbonyl group (including a —CO group in the amido group) and a terminal oxygen atom of the polyalkylene glycol chain (1) are preferably adjacent to each other at the bonding site between the organic residue and the polyalkylene glycol chain (1). In other words, the polyalkylene glycol chain (1) and $Y^2$ are preferably bonded to each other via an ester bond or an amido bond in the polymer (i).

One preferable mode of the multi-branched polyalkylene glycol polymer (i) has the structure represented by the following formula (1):

[Chem. 3]

(1)

wherein X is a residue of the compound having three or more active hydrogen atoms; each AO is a C2-C18 oxyalkylene group, and the AOs may be the same as or different from each other; each $Y^2$ is a direct bond or an organic residue; each Z is a polymer portion having a constitutional unit derived from a vinyl monomer component; each n is the average number of moles of the oxyalkylene groups added and is 5 to 1,000, and the ns may be the same as or different from each other; and m is an integer of 1 to 50.

In formula (1), the residue of the compound having three or more active hydrogen atoms represented by X, the C2-C18 oxyalkylene group represented by AO, the organic residue among those represented by $Y^1$, the polymer portion represented by Z, and the average number of moles of the oxyalkylene groups added represented by n are as mentioned above. In addition, m represents the number of polyalkylene glycol chains (1) with the polymer (ii) bonded directly or via an organic residue to which the compound having three or more active hydrogen atoms represented by X bonded, and is also as mentioned above.

A more preferable mode of the multi-branched polyalkylene glycol polymer (i) has the structure represented by the following formula (1'):

[Chem. 4]

(1')

wherein X, AO, Z, n, and m each are the same as those in formula (1); each Y is an organic residue having a carbonyl group or an amido group; and a terminal oxygen atom of the oxyalkylene group represented by AO and a carbon atom in the carbonyl group or the amido group are adjacent to each other.

The polymer (ii) may be a single polymer, or may be a mixture of two or more polymer species. The vinyl monomer component forming this polymer (ii) preferably contains an unsaturated carboxylic monomer as an essential ingredient. Such a structure leads to an increase in the hydrophilicity of the polymer, and makes the polymer more useful in various applications. In the case that the polymer is used for applications such as an admixture for cement, the vinyl monomer component preferably contains an unsaturated polyalkylene glycol monomer for higher dispersibility. In this case, the ability of dispersing cement particles is probably improved dramatically by the synergistic effect of the steric repulsion of the multi-branched structure and the steric repulsion of the polyalkylene glycol chain (hereinafter, this polyalkylene glycol chain is referred to as the "polyalkylene glycol chain (2)") derived from the unsaturated polyalkylene glycol monomer. The vinyl monomer component more preferably has an unsaturated carboxylic monomer (a) and an unsaturated polyalkylene glycol monomer (b). In other words, the polymer (ii) preferably has a constitutional unit derived from the unsaturated carboxylic monomer (a) and a constitutional unit derived from the unsaturated polyalkylene glycol monomer (b).

Preferable examples of the unsaturated carboxylic monomer (a) (hereinafter, also referred to simply as the "monomer (a)") include compounds represented by the following formula (4):

[Chem. 5]

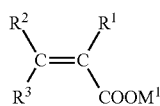

(4)

wherein $R^1$, $R^2$, and $R^3$ each are a hydrogen atom, a methyl group, or $(CH_2)_xCOOM^2$ and may be the same as or different from each other; $—(CH_2)_xCOOM^2$ may form an anhydride with $—COOM^1$ or other $—(CH_2)_xCOOM^2$; x is an integer of 0 to 2; $M^1$ and $M^2$ each are a hydrogen atom, a monovalent metal, a divalent metal, a trivalent metal, a quaternary ammonium salt group, or an organic amine salt group, and may be the same as or different from each other.

Here, the constitutional unit derived from the monomer (a) corresponds to a structure in which the polymeric double bond of the polymer (a) represented by formula (4) is cleaved by the polymerization reaction (the double bond (C=C) is cleaved to be a single bond (—C—C—)).

Examples of the metal atoms represented by $M^1$ and $M^2$ in formula (4) include monovalent metal atoms such as alkaline metal atoms e.g. lithium, sodium, and potassium; divalent metal atoms such as alkaline earth metal atoms e.g. calcium and magnesium; and trivalent metal atoms such as aluminum and iron. Examples of the organic amine salt group include alkanol amine groups such as an ethanol amine group, a diethanol amine group, and a triethanol amine group, and a triethyl amine group.

Specific examples of the unsaturated carboxylic monomer represented by formula (4) include: monocarboxylic monomers such as acrylic acid, methacrylic acid, and crotonic acid; dicarboxylic monomers such as maleic acid, itaconic acid, and fumaric acid; and anhydrides and salts of these carboxylic acids (e.g. alkaline metal salts, alkaline earth metal salts, trivalent metal salts, ammonium salts, and organic amine salts). Particularly preferable are acrylic acid, methacrylic acid, maleic acid, maleic anhydride, and salts thereof for good polymerizability; more preferable are acrylic acid, methacrylic acid, and salts thereof.

The unsaturated polyalkylene glycol monomer (b) (hereinafter, also referred to simply as the "monomer (b)") is preferably a compound represented by the following formula (5):

[Chem. 6]

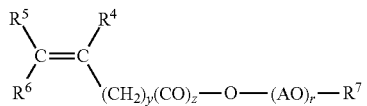

(5)

wherein $R^4$, $R^5$ and $R^6$ each are a hydrogen atom or a methyl group, and may be the same as or different from each other; $R^7$ is a hydrogen atom or a C1-C20 hydrocarbon group; each AO is one or more species of C2-C18 oxyalkylene groups, and the AOs may be the same as or different from each other; in the case that two or more species of oxyalkylene groups represented by AO are present, these groups may be introduced in a block state or randomly; y is an integer of 0 to 2; z is 0 or 1; r is an average number of moles of the oxyalkylene group added and is 1 to 300.

Here, the constitutional unit derived from the monomer (b) corresponds to the structure in which the polymeric double bond of the monomer (b) represented by formula (5) is cleaved by the polymerization reaction (the double bond (C=C) is cleaved to be a single bond (—C—C—)).

Examples of the C1-C20 hydrocarbon group among the terminal groups represented by $R^7$ in formula (5) include C1-C20 aliphatic alkyl groups, C3-C20 alicyclic alkyl groups, C2-C20 alkenyl groups, C2-C20 alkynyl groups, and C6-C20 aryl groups.

The terminal group represented by $R^7$ is preferably a hydrophilic group for good dispersibility of cement particles in the case that the polymer is used for an admixture for cement. Specifically, it is preferably a hydrogen atom or a C1-C8 hydrocarbon group. It is more specifically a hydrogen atom or a C1-C6 hydrocarbon group, further preferably a hydrogen atom or a C1-C3 hydrocarbon group, and particularly preferably a hydrogen atom or a methyl group.

The polyalkylene glycol chain (2) represented by $(AO)_r$ in formula (5) is preferably one mainly comprising a C2 oxyethylene group (ethylene oxide). In such a case, the polymer (ii) to be obtained is allowed to have sufficient hydrophilicity, and the multi-branched polyalkylene glycol polymer of the present invention is imparted sufficient water solubility and sufficient dispersibility of cement particles.

Here, the phrase "mainly comprising" means that the mol % value of the oxyethylene group for 100 mol % of all the oxyalkylene groups (alkylene glycol units) constituting the polyalkylene glycol chain (2) is preferably 50 to 100 mol %, for example. If the value is lower than 50 mol %, the oxyalkylene group is not imparted sufficient hydrophilicity, and may not be imparted sufficient dispersibility of cement particles. The value is more preferably 60 mol % or more, further preferably 70 mol % or more, particularly preferably 80 mol % or more, and most preferably 90 mol % or more.

The polyalkylene glycol chain (2) represented by $(AO)_r$ may partially contain an oxyalkylene group having three or more carbon atoms that has higher hydrophobicity. This is because, in the case that the polymer with such a hydrophobic group introduced therein is used for an admixture for cement (dispersant), the polyalkylene glycol chains (2) show mild hydrophobic interaction therebetween in the aqueous solution and the viscosity of the cement composition is controlled, and thereby the workability is improved in some cases. In the case of introducing an oxyalkylene group having three or more carbon atoms, the amount thereof is preferably 50 mol % or less for 100 mol % of all the oxyalkylene groups (alkylene glycol units) constituting the polyalkylene glycol chain (2) for sufficiently maintained water solubility, for example. The amount is more preferably 25 mol % or less, and is further preferably 10 mol % or less. For improved workability, the amount is preferably 1 mol % or more. The amount is more preferably 2.5 mol % or more, and is further preferably 5 mol % or more.

The oxyalkylene group having three or more carbon atoms is preferably a propylene oxide group or a butylene oxide group for easy production; in particular, propylene oxide group is more preferable.

In the case that the polyalkylene glycol chain (2) comprises a C2 oxyethylene group and an oxyalkylene group having three or more carbon atoms, these groups may be arranged randomly or in a block state. In the case of the block arrangement, the hydrophilicity of the hydrophilic block seems to be more strongly exerted and the hydrophobicity of the hydrophobic block seems to be more strongly exerted in comparison with the case of the random arrangement, and as a result the cement composition shows improved dispersibility and workability; thus, the block arrangement is preferable. In particular, the groups are preferably arranged in the state of an A-B-A block as (C2 oxyethylene groups)-(oxyalkylene groups each having three or more carbon atoms)-(C2 oxyethylene groups).

In formula (5), r is the number of 1 to 300; if r is greater than 300, some troubles may occur in the production. In the case that the polymer is used for an admixture for cement, the cement composition may have high viscosity so that the workability may be insufficient. From the viewpoint of easy production, r is appropriately 300 or lower, preferably 200 or lower, more preferably 150 or lower, further preferably 100 or lower, particularly preferably 75 or lower, and most preferably 50 or lower. From the viewpoint of good dispersibility of cement particles, r is preferably 4 or greater, more preferably 6 or greater, further preferably 10 or greater, and particularly preferably 25 or greater.

Specific examples of the unsaturated polyalkylene glycol monomer represented by formula (5) include unsaturated alcohol polyalkylene glycol adducts and polyalkylene glycol ester monomers.

The unsaturated alcohol polyalkylene glycol adducts are not limited as long as they are compounds each having a structure in which a polyalkylene glycol chain is added to an alcohol having an unsaturated group.

The polyalkylene glycol ester monomers are not limited as long as they are monomers each having a structure in which an unsaturated group and a polyalkylene glycol chain are bonded via an ester bond. Examples thereof include unsaturated carboxylic polyalkylene glycol ester compounds. Particularly preferable are (alkoxy)polyalkylene glycol mono (meth)acrylates.

Examples of the unsaturated alcohol polyalkylene glycol adducts include vinyl alcohol alkylene oxide adducts, (meth) allyl alcohol alkylene oxide adducts, 3-buten-1-ol alkylene oxide adducts, isoprene alcohol (3-methyl-3-buten-1-ol) alkylene oxide adducts, 3-methyl-2-buten-1-ol alkylene oxide adducts, 2-methyl-3-buten-2-ol alkylene oxide adducts, 2-methyl-2-buten-1-ol alkylene oxide adducts, and 2-methyl-3-buten-1-ol alkylene oxide adducts.

Specific examples of the unsaturated alcohol polyalkylene glycol adducts include polyethylene glycol monovinyl ether, polyethylene glycol monoallyl ether, polyethylene glycol mono(2-methyl-2-propenyl)ether, polyethylene glycol mono (2-butenyl)ether, polyethylene glycol mono(3-methyl-3-butenyl)ether, polyethylene glycol mono(3-methyl-2-butenyl)ether, polyethylene glycol mono(2-methyl-3-butenyl) ether, polyethylene glycol mono(2-methyl-2-butenyl)ether, polyethylene glycol mono(1,1-dimethyl-2-propenyl)ether, polyethylene polypropylene glycol mono(3-methyl-3-butenyl)ether, methoxy polyethylene glycol mono(3-methyl-3-butenyl)ether, ethoxy polyethylene glycol mono(3-methyl-3-butenyl)ether, 1-propoxy polyethylene glycol mono(3-methyl-3-butenyl)ether, cyclohexyloxy polyethylene glycol mono(3-methyl-3-butenyl)ether, phenoxy polyethylene glycol mono(3-methyl-3-butenyl)ether, methoxy polyethylene glycol monoallyl ether, ethoxy polyethylene glycol monoallyl ether, phenoxy polyethylene glycol monoallyl ether, methoxy polyethylene glycol mono(2-methyl-2-propenyl) ether, ethoxy polyethylene glycol mono(2-methyl-2-propenyl)ether, and phenoxy polyethylene glycol mono(2-methyl-2-propenyl)ether.

Examples of the (alkoxy)polyalkylene glycol mono(meth)acrylate include esterified products between alkoxypolyalkylene glycols formed by adding 1 to 25 mols of C2-18 alkylene oxide groups to alcohols, in particular alkoxypolyalkylene glycols mainly containing ethylene oxide, and (meth)acrylic acid.

Examples of the alcohols include C1-C30 aliphatic alcohols such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol, and stearyl alcohol; C3-C30 alicyclic alcohols such as cyclohexanol; and C3-C30 unsaturated alcohols such as (meth)allyl alcohol, 3-buten-1-ol, 3-methyl-3-buten-1-ol.

Specific examples of the esterified products include the following (alkoxy)polyethylene glycol(poly) (C2-C4 alkylene glycol)(meth)acrylates: methoxypolyethylene glycol mono(meth)acrylate, methoxy{polyethylene glycol(poly)propylene glycol}mono(meth)acrylate, methoxy{polyethylene glycol (poly)butylene glycol}mono (meth)acrylate, methoxy{polyethylene glycol(poly)propylene glycol (poly)butylene glycol}mono(meth)acrylate, ethoxypolyethylene glycol mono(meth)acrylate, ethoxy{polyethylene glycol(poly)propylene glycol}mono (meth)acrylate, ethoxy{polyethylene glycol (poly)butylene glycol}mono(meth)acrylate, ethoxy{polyethylene glycol (poly)propylene glycol (poly)butylene glycol}mono(meth)acrylate, propoxypolyethylene glycol mono(meth)acrylate, propoxy{polyethylene glycol(poly)propylene glycol}mono (meth)acrylate, propoxy{polyethylene glycol (poly)butylene glycol}mono(meth)acrylate, propoxy{polyethylene glycol (poly)propylene glycol (poly)butylene glycol}mono(meth)acrylate,
butoxypolyethylene glycol mono(meth)acrylate, butoxy{polyethylene glycol(poly)propylene glycol}mono (meth)acrylate, butoxy{polyethylene glycol (poly)butylene glycol}mono(meth)acrylate, butoxy{polyethylene glycol (poly)propylene glycol (poly)butylene glycol}mono(meth)acrylate, pentoxypolyethylene glycol mono(meth)acrylate, pentoxy{polyethylene glycol(poly)propylene glycol}mono (meth)acrylate, pentoxy{polyethylene glycol (poly)butylene glycol}mono(meth)acrylate, pentoxy{polyethylene glycol (poly)propylene glycol(poly)butylene glycol}mono(meth)acrylate, hexoxypolyethylene glycol mono(meth)acrylate, hexoxy{polyethylene glycol(poly)propylene glycol}mono (meth)acrylate, hexoxy{polyethylene glycol (poly)butylene glycol}mono(meth)acrylate, hexoxy{polyethylene glycol (poly)propylene glycol (poly)butylene glycol}mono(meth)acrylate,
heptoxypolyethylene glycol mono(meth)acrylate, heptoxy{polyethylene glycol(poly)propylene glycol}mono (meth)acrylate, heptoxy{polyethylene glycol (poly)butylene glycol}mono(meth)acrylate, heptoxy{polyethylene glycol (poly)propylene glycol (poly)butylene glycol}mono(meth)acrylate, octoxypolyethylene glycol mono(meth)acrylate, octoxy{polyethylene glycol(poly)propylene glycol}mono (meth)acrylate, octoxy{polyethylene glycol (poly)butylene glycol}mono(meth)acrylate, octoxy{polyethylene glycol (poly)propylene glycol (poly)butylene glycol}mono(meth)acrylate, nonanoxypolyethylene glycol mono(meth)acrylate, nonanoxy{polyethylene glycol(poly)propylene glycol}mono(meth)acrylate, nonanoxy{polyethylene glycol (poly)butylene glycol}mono(meth)acrylate, and nonanoxy{polyethylene glycol(poly)propylene glycol (poly)butylene glycol}mono(meth)acrylate.

The vinyl monomer component used for producing the polymer (ii) may further include another copolymerizable monomer (hereinafter, also referred to as the "monomer (c)") in addition to the unsaturated carboxylic monomer (a) and the unsaturated polyalkylene glycol monomer (b).

In this case, the polymer (ii) further includes a constitutional unit derived from the monomer (c). Here, the constitutional unit derived from the monomer (c) corresponds to the structure in which the polymeric double bond of the monomer (c) is cleaved by the polymerization reaction (structure in which the double bond (C=C) is cleaved to be a single bond (—C—C—)).

In the case of using the monomer (c), the amount thereof is preferably 30% by weight or less for 100% by weight of all the vinyl monomer components. The amount is more preferably 25% by weight or less, and further preferably 20% by weight or less.

Specific examples of the monomer (c) include the following compounds, and each of these may be used alone or two or more of these may be used in combination:

half esters and diesters between unsaturated dicarboxylic monomers, e.g. maleic acid, maleic anhydride, fumaric acid, itaconic acid, and citraconic acid, and C23-C30 alcohols; half amides and diamides between the unsaturated dicarboxylic monomers and C23-C30 amines; half esters and diesters between alkyl(poly)alkylene glycols prepared by adding 1 to 500 mol of a C2-C18 alkylene oxide to the alcohol or amine and the unsaturated dicarboxylic monomers; half esters and diesters between the unsaturated dicarboxylic monomers and C5-C18 glycols or polyalkylene glycols with the number of moles of these glycols added of 2 to 500; half amides between maleamic acid and C5-C18 glycols or polyalkylene glycols with the number of moles of these glycols added of 2 to 500;

(poly)alkylene glycol di(meth)acrylates such as triethylene glycol di(meth)acrylate, (poly)ethylene glycol di(meth)acrylate, polypropylene glycol di(meth)acrylate, and (poly)ethylene glycol(poly)propylene glycol di(meth)acrylate; polyfunctional (meth)acrylates such as hexanediol di(meth)acrylate, trimethylolpropane tri(meth)acrylate, and trimethylolpropane di(meth)acrylate; (poly)alkylene glycol dimaleates such as triethylene glycol dimaleate and polyethylene glycol dimaleate; unsaturated sulfonates such as vinyl sulfonate, (meth)allyl sulfonate, 2-(meth)acryloxyethyl sulfonate, 3-(meth)acryloxypropyl sulfonate, 3-(meth)acryloxy-2-hydroxypropyl sulfonate, 3-(meth)acryloxy-2-hydroxypropyl sulfonyl ether, 3-(meth)acryloxy-2-hydroxypropyl oxysulfobenzoate, 4-(meth)acryloxybutyl sulfonate, (meth)acrylamidomethyl sulfonate, (meth)acrylamidoethyl sulfonate, 2-methyl-propane sulfonate(meth)acrylamide, and styrene sulfonate; and monovalent metal salts, divalent metal salts, ammonium salts, and organoamine salts thereof;

amides of unsaturated monocarboxylic acids and C1-C30 amines such as methyl(meth)acrylamide; vinyl aromatic compounds such as styrene, α-methyl styrene, vinyl toluene, and p-methyl styrene; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth)acryl amide, (meth)acryl alkyl amides, N-methylol (meth)acrylamide, and N,N-dimethyl(meth)acrylamide; unsaturated cyanogens such as (meth)acrylonitrile and α-chloro acrylonitrile; and unsaturated esters such as vinyl acetate and vinyl propionate.

The multi-branched polyalkylene glycol polymer (i) may further have a polyalkylene glycol chain that does not bond to the polymer (ii).

Such a polyalkylene glycol chain is preferably terminated (at the end opposite to the residue of the compound having three or more active hydrogen atoms) with a structure bonding to any one of a hydrogen atom, a monovalent metal atom, a divalent metal atom, an ammonium group, an organoamine group, a C1-C30 hydrocarbon group, an oxohydrocarbon group, an amido hydrocarbon group, a carboxyl hydrocarbon group, and a C0-C30 sulfonyl (hydrocarbon) group. In the case that the polymer has two or more of such polyalkylene glycol chains per molecule, the terminal structures may be the same as or different from each other. Preferable among these terminal structures are structures bonding to a hydrogen atom or a C1-C30 hydrocarbon group for multiplicity of uses. More preferable are structures bonding to a hydrogen atom or a C1-C10 hydrocarbon group, and preferable among C1-C10 hydrocarbon groups are alkyl groups and alkylene groups.

In the case that the multi-branched polyalkylene glycol polymer (i) is a polymer represented by the above formula (1), the polymer may be a compound represented by formula (2):

[Chem. 7]

(2)

wherein X, AO, $Y^1$, n, and m are the same as those mentioned in formula (1); each n' is an average number of moles of oxyalkylene groups added, is 1 to 1000, and the n's may be the same as or different from each other; here, each n' has the same structure as the n in a preferable embodiment, and n and n' may be the same as or different from each other; each Q is a hydrogen atom, a C1-C10 alkyl group or alkylene group; p is an integer of 0 or greater, and the maximum value thereof depends on the number of active hydrogen atoms in the compound having three or more active hydrogen atoms represented by X and the value of m.

The symbol p represents a value whose maximum value depends on the number of active hydrogen atoms in the compound having three or more active hydrogen atoms represented by X and the value of m. In order to sufficiently achieve the effects owing to the polyalkylene glycol chain (1) bonding to the polymer (ii) directly or via an organic residue, the value of p is preferably not more than [(the number of active hydrogen atoms in the compound having three or more active hydrogen atoms)-3] so that the number of the polyalkylene glycol chain bonding to the compound having three or more active hydrogen atoms is 3 or more.

The multi-branched polyalkylene glycol polymer (i) of the present invention preferably has a weight average molecular weight (Mw) of 300,000 or less for good handleability and properties such as retaining ability of a cement composition in the case that the polymer is used for an admixture for cement. The weight average molecular weight is more preferably 200,000 or less, further preferably 150,000 or less, and particularly preferably 100,000 or less. In the case of being used for an admixture for cement, the polymer is more likely to exert its effects as it is adsorbed to cement particles to some extent. Since the adsorbing power becomes larger as the Mw becomes greater, the Mw is preferably 10,000 or more. The Mw is more preferably 15,000 or more, further preferably 18,000 or more, and particularly preferably 20,000 or more.

The weight average molecular weight of the polymer may be measured by gel permeation chromatography (GPC) as mentioned below.

<Method for Producing Multi-Branched Polyalkylene Glycol Polymer>

The present invention is also a method for producing the multi-branched polyalkylene glycol polymer (i). The production method is also a method for producing a multi-branched polyalkylene glycol polymer, comprising polymerizing vinyl monomer units in the presence of a compound having a polyalkylene glycol chain represented by formula (3):

[Chem. 8]

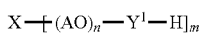

(3)

wherein X is a residue of the compound having three or more active hydrogen atoms; each AO is a C2-C18 oxyalkylene group, and the AOs may be the same as or different from each other; each $Y^1$ is a direct bond or an organic residue; each n is the average number of moles of oxyalkylene groups added, is 5 to 1,000, and the ns may be the same as or different from each other; and m is an integer of 1 to 50.

Here, the present invention also includes, as one aspect, the multi-branched polyalkylene glycol polymer having a polyalkylene glycol chain and obtained by the method including polymerizing vinyl monomer components in the presence of the compound having a polyalkylene glycol chain represented by formula (3).

In the method for producing the multi-branched polyalkylene glycol polymer (i), the polyalkylene glycol chain-containing compound is not limited as long as it has a structure represented by formula (3).

Here, a residue of the compound having three or more active hydrogen atoms represented by X, a C2-C18 oxyalkylene group represented by AO, an organic residue among those represented by $Y^1$, and the average number of moles of oxyalkylene groups added represented by n are the same as those mentioned above. In addition, m is the number of polyalkylene glycol chains (1) bonding, directly or via an organic residue, to the polymer (ii) to which the compound having three or more active hydrogen atoms represented by X bonded, and this is also the same as mentioned above.

In formula (3), $Y^1$ means that the $(AO)_n$ and the H directly bond to each other or represents an organic residue. It is preferably an organic residue, but may be a direct bond. In other words, the multi-branched polyalkylene glycol polymer (i) may have a structure in which the polyalkylene glycol chain (1) directly, without an organic residue, bonds to the polymer (ii) starting from the residue of the compound having three or more active hydrogen atoms. Such a polymer (i) may be produced by polymerizing vinyl monomer components in the presence of the compound in which $Y^1$ is a direct bond among the compounds having a polyalkylene glycol chain represented by formula (3) (hereinafter, this production method is referred to as the "production method A"). In this case, it is preferable to create a radical from the polyalkylene glycol chain (1) and graft-polymerize vinyl monomer components starting from the radical in order to bond the polyalkylene glycol chain (1) and the polymer (ii). In this process, a radical generator may be a radical polymerization initiator mentioned below. In particular, organoperoxides are preferable because they show high performance of generating a radical by extracting a hydrogen atom from the polyalkylene glycol chain (1).

With respect to the method for producing the multi-branched polyalkylene glycol polymer (i) in which $Y^1$ is a direct bond, another preferable examples thereof include a method in which a radical is generated from a carbon atom to which a terminal alcohol group of the polyalkylene glycol chain (1) bonded and vinyl monomer components are polymerized (hereinafter, this production method is referred to as the "polymerization method B"). In the production method A, the characteristics of the polymer (i) may be changed depending on the position to which the polymer (ii) bonds in the polyalkylene glycol chain (1); while in the production method B, the polymer (i) stably shows high characteristics because the carbon atom to which the terminal alcohol group of the polyalkylene glycol chain (1) always bonds to the polymer (ii). In this case, the radical generator is preferably a rare-earth compound having an oxidation power. It is preferably a cerium (IV) compound. Examples thereof include cerium (IV) sulfate and cerium (IV) ammonium nitrate. In this method, the polyalkylene glycol chain-containing compound represented by formula (3) is preferably a monohydric alcohol. Alcohols having two or more hydroxy groups may cause decreased radical-generating efficiency.

$Y^1$ is particularly preferably an organic residue as mentioned above. The organic residue is preferably a group having a sulfur atom as mentioned above. In this case, the sulfur atom preferably bonds to a terminal hydrogen atom in formula (3).

In other words, the polyalkylene glycol chain-containing compound represented by formula (3) is preferably a compound having a mercapto group (thiol group, SH group) (hereinafter, referred to as the "polyalkylene glycol chain-containing thiol compound (I)"). In this case, the multi-branched polyalkylene glycol polymer (i) has a structure derived from the polyalkylene glycol chain-containing thiol compound (I). Such a multi-branched polyalkylene glycol polymer (i) having a structure derived from the polyalkylene glycol chain-containing thiol compound (I) is also one preferable aspect of the present invention. In such a case, polymerization is performed by utilizing the specific reactivity of the mercapto group. As a result, the polymer (i) of the present invention is more efficiently and easily produced at low cost.

The structure derived from the polyalkylene glycol chain-containing thiol compound (I) is also preferably a structure in which at least one end of the polyalkylene glycol chain bonds to a mercapto group via a group having a carbonyl group. In other words, the polyalkylene glycol chain-containing thiol compound (I) is preferably a thiol compound having a structure in which the compound has a polyalkylene glycol chain, one end of the polyalkylene glycol chain bonds to a residue of the compound having three or more active hydrogen atoms, and at least one of the other ends of the polyalkylene glycol chain bonds to a mercapto group via a group having a carbonyl group (hereinafter, this compound is referred to as the "polyalkylene glycol chain-containing thiol compound (II)"). Such a polyalkylene glycol chain-containing thiol compound (II) is also one aspect of the present invention. Thus, the multi-branched polyalkylene glycol polymer (i) is particularly preferably a polymer having a structure derived from such a polyalkylene glycol chain-containing thiol compound (II). The detail of this polyalkylene glycol chain-containing thiol compound (II) will be mentioned below.

In the multi-branched polyalkylene glycol polymer having a structure derived from the polyalkylene glycol chain-containing thiol compound (II), at least one terminal unit on the side of the group having a carbonyl group of the polyalkylene glycol chain in the structure derived from the compound is preferably an oxyalkylene group having three or more carbon atoms or the group having a carbonyl group is preferably a group having a carbonyl group and a tertiary or quaternary carbon atom bonding to the carbonyl group. In other words, the multi-branched polyalkylene glycol polymer (i) of the present invention is preferably a polymer obtained by polymerizing vinyl monomer components in the presence of a compound satisfying the following structure (II-1) and/or the structure (II-2) as the polyalkylene glycol chain-containing thiol compound (II): (II-1) at least one terminal unit on the side of the group having a carbonyl group of the polyalkylene glycol chain is an oxyalkylene group having three or more carbon atoms; and (II-2) the group having a carbonyl group is a group having a carbonyl group and a tertiary or quaternary carbon atom bonding to the carbonyl group. In this case, the polymer shows extremely high dispersibility and hydrolysis resistance and stably shows high dispersibility for a long time owing to the steric repulsion of the polyalkylene glycol chain (1) derived from the polyalkylene glycol chain-containing thiol compound (II) and the specific structures (II-1) and/or (II-2). Thus, the polymer is useful in more various fields. As mentioned here, the polymer in which at least one terminal unit on the side of the group having a carbonyl group of the polyalkylene glycol chain is an oxyalkylene group having three or more carbon atoms or in which the group having a carbonyl group is a group having a carbonyl group and a tertiary or quaternary carbon atom bonding to the carbonyl group is also one preferable aspect of the present invention.

The detail of the polyalkylene glycol chain-containing thiol compound (II) satisfying the structure (II-1) and/or (II-2) is as mentioned below.

In the method for producing the multi-branched polyalkylene glycol polymer, in the case that the polyalkylene glycol chain-containing thiol compound (I) (preferably, the below-mentioned polyalkylene glycol chain-containing thiol compound (II)) is used, radicals are generated from the mercapto group by factors such as heat, light, and radiation, or radicals are generated by a polymerization initiator that is separately used as necessary, and radicals chain-transfer to the mercapto group, and if the mercapto groups bond to each other to form a disulfide bond, the disulfide bond is cleaved, and monomers successively attach thereto via the sulfur atom (S) to form the portion of the polymer (ii). Thereby, the polymer (i) of the present invention is efficiently produced.

In addition to such a polyalkylene glycol chain-containing thiol compound (I), a compound having a group that has reactivity with the main chain end of the polymer (ii) and that may serve as a chain transfer agent or a radical initiator other than the mercapto group may be used as the polyalkylene glycol chain-containing compound. Examples of such a group include a peroxide group and an azo group. These groups also lead to polymerization reaction in the same manner as in the polyalkylene glycol chain-containing thiol compound (I).

In the method for producing the multi-branched polyalkylene glycol polymer, vinyl monomer components are caused to polymerize in the presence of the polyalkylene glycol chain-containing compound as exemplified in such a polyalkylene glycol chain-containing thiol compound (I).

In the case that the polymerization reaction is caused in the presence of the polyalkylene glycol chain-containing thiol compound (I), for example, monomers successively attach thereto via terminal sulfur atoms (S) to form the polymer (ii) as mentioned above, and thereby the polymer (i) of the present invention is formed as a main component. In some cases, a polymer with two or more units of the polymer (ii) repeated therein or with a constitutional unit derived from one or more of monomers (a), (b), and (c) may be sub-produced.

The amount of the polyalkylene glycol chain-containing compound (preferably the polyalkylene glycol chain-containing thiol compound (i), and more preferably the polyalkylene glycol chain-containing thiol compound (II)) used in the polymerization reaction is preferably 1 to 80 parts by weight for 100 parts by weight of the vinyl monomer components. If the amount is less than 1 part by weight, the effects owing to the polyalkylene glycol chain-containing compound may not be sufficiently achieved; while if the amount is more than 80 parts by weight, the performance owing to the vinyl monomer components may not be sufficiently achieved. The lower limit of the amount is more preferably 2 parts by weight, and further preferably 4 parts by weight; while the upper limit thereof is more preferably 50 parts by weight, and further preferably 30 parts by weight.

The polymerization reaction may be performed by a technique such as solution polymerization or bulk polymerization in the presence of, if necessary, a radical polymerization initiator. The solution polymerization may be performed in batch processing or continuous processing, or in combination thereof. Examples of the solvent to be used include water; alcohols such as methyl alcohol, ethyl alcohol, and isopropyl alcohol; aromatic and aliphatic hydrocarbons such as benzene, toluene, xylene, cyclohexane, and n-hexane; esterified compounds such as ethyl acetate; ketone compounds such as acetone and methyl-ethyl ketone; and cyclic etherified compounds such as tetrahydrofuran and dioxane. Particularly for applications in which the polymer is used in an aqueous solution state, such as an admixture for cement, the monomers are preferably polymerized by aqueous solution polymerization.

In the aqueous solution polymerization among the solution polymerization techniques, water-soluble radical polymerization initiator is preferably used because it eliminates necessity to remove insoluble contents after polymerization. Examples thereof include persulfates such as ammonium persulfate, sodium persulfate, and potassium persulfate; hydrogen peroxide; and water-soluble azo initiators such as azoamidine compounds e.g. 2,2'-azobis-2-methyl-propionamidine hydrochloride, cyclic azoamidine compounds e.g. 2,2'-azobis-2-(2-imidazolin-2-yl)propane hydrochloride, azonitrile compounds e.g. 2-carbamoyl azoisobutyronitrile, azoamide compounds e.g. 2,4'-azobis{2-methyl-N-[2-(1-hydroxybutyl)]propionamide}, and macroazo compounds e.g. esters of 4,4'-azobis(4-cyanovaleric acid) and (alkoxy)polyethylene glycols. Each of these may be used alone or two or more of these may be used in combination. Particularly preferable are water-soluble azo initiators as mentioned below.

In this case, a accelerator (reductant) may be used in combination. Examples of the accelerator include alkaline metal sulfites such as sodium hydrogen sulfite, meta disulfites, sodium hypophosphite, ferrous salts such as Mohr's salt, sodium hydroxymethane sulfinate dihydrate, hydroxylamine chloride, thiourea, L-ascorbic acid (salts), and erythorbic acid (salts). For example, hydrogen peroxide and an organic reductant may be used in combination. Examples of the organic reductant include L-ascorbic acid (salts), L-ascorbic acid esters, erythorbic acid (salts), and erythorbic acid esters. Each of these radical polymerization initiators and accelerators (reductants) may be used alone or two or more of these may be used in combination.

The amount of the accelerator (reductant) is not particularly limited. For example, the amount thereof is preferably 10 mol or more, more preferably 20 mol or more, and further preferably 50 mol or more for 100 mol in total of the polymerization initiator(s) used in combination. The amount thereof is preferably 1,000 mol or less, more preferably 500 mol or less, and further preferably 400 mol or less.

In solution polymerization or bulk polymerization in which a lower alcohol, an aromatic or aliphatic hydrocarbon, an ester, or a ketone is used as a solvent, the radical polymerization initiator used therein may be one or more selected from peroxides such as benzoyl peroxide, lauroyl peroxide, and sodium peroxide; hydroperoxides such as t-butyl hydroperoxide and cumen hydroperoxide; and water-soluble azo initiators such as azonitrile compounds e.g. azobis isobutyronitrile, azoamide compounds e.g. 2,4'-azobis{2-methyl-N-[2-(1-hydroxybutyl)]propionamide}, and macroazo compounds e.g. esters of 4,4'-azobis(4-cyanovaleric acid) and (alkoxy)polyethylene glycols. Particularly preferable are water-soluble azo initiators as mentioned below. In this case, a accelerator such as an amine compound may be used in combination.

In the case that the solvent is a mixture of water and a lower alcohol, it may be selected from the above various radical polymerization initiators and the combinations of the radical polymerization initiators and the accelerators.

In the present invention, the polymerization initiator is preferably a carbon radical generator that easily generates a radical from a mercapto group and a disulfide bond in consideration that a radical is generated from the mercapto group of the polyalkylene glycol chain-containing thiol compound (i) and from the disulfide bond in the multimer thereof due to factors such as heat, light, and radiation. As mentioned here, the aspect in which a carbon radical generator is used in the polymerization step is also one preferable aspect of the present invention. Particularly preferable as the carbon radical generator is an azo initiator. Such an initiator enables efficient production of the aforementioned radially multi-branched polymer. More preferable are the aforementioned water-soluble azo initiators.

In the case that a persulfate or hydrogen peroxide is used as the polymerization initiator, the mercapto group of the polyalkylene glycol chain-containing thiol compound (i) is oxidized, and thus the polymer may not be produced at a sufficient yield.

The amount of the radical polymerization initiator may be appropriately adjusted depending on the structure and the amount of the polyalkylene glycol chain-containing thiol compound (i). If the amount of the radical polymerization initiator is incommensurate to that of the vinyl monomer components to be used for the polymerization, the polymerization reaction may slowly proceed due to too low a radical concentration; while if it is superabundant, the radical concentration is too high and the polymerization reaction due to the vinyl monomer components proceeds prior to those due to the mercapto group and the disulfide bond. As a result, the yield of the aforementioned radially multi-branched polymer may not be improved. Thus, the amount of the radical polymerization initiator is preferably 0.001 mol or more, more preferably 0.01 mol or more, further preferably 0.1 mol or more, and particularly preferably 0.2 mol or more for 100 mol in total of the vinyl monomer components, and the amount thereof is preferably 10 mol or less, more preferably 5 mol or less, further preferably 2 mol or less, and particularly preferably 1 mol or less.

A general chain transfer agent may be used in the polymerization reaction. Examples of the usable chain transfer agent include hydrophilic chain transfer agents such as thiol chain transfer agents e.g. mercapto ethanol, thio glycerol, thio glycol acid, 3-mercapto propionic acid, thio malic acid, and 2-mercaptoethane sulfonic acid; dihydric alcohols e.g. isopropyl alcohol; and lower oxides and salts thereof e.g. phosphorous acid, hypophosphorous acid, and salts thereof (sodium hypophosphite and potassium hypophosphite), sulfurous acid, hydrogen sulfite, dithionous acid, metabisulfurous acid, and salts thereof (sodium sulfite, sodium hydrogen sulfite, sodium dithionite, and sodium metabisulfite).

The chain transfer agent may be a hydrophobic chain transfer agent. Examples of the hydrophobic chain transfer agent include thiol chain transfer agents having a hydrocarbon group with three or more carbon atoms such as butane thiol, octane thiol, decane thiol, dodecane thiol, hexadecane thiol, octadecane thiol, cyclohexyl mercaptan, thio phenol, thio octyl glycolate, and 3-mercapto octyl propionate.

Each of the chain transfer agents may be used alone or two or more of these may be used in combination. In addition, a hydrophilic chain transfer agent and a hydrophobic chain transfer agent may be used in combination.

The amount of the chain transfer agent may be appropriately adjusted depending on the structure and the amount of the polyalkylene glycol chain-containing thiol compound (i). The amount is preferably 0.1 mol or more, more preferably 0.25 mol or more, further preferably 0.5 mol or more, while preferably 20 mol or less, more preferably 15 mol or less, further preferably 10 mol or less, for 100 mol in total of the vinyl monomer components.

The polymerization conditions such as polymerization temperature in the polymerization reaction may be appropriately adjusted depending on the polymerization method, the solvent, the polymerization initiator, and the chain transfer agent to be used therein. The polymerization temperature is preferably 0° C. or higher and 150° C. or lower. The temperature is more preferably 30° C. or higher, and further preferably 50° C. or higher. Also, the temperature is more preferably 120° C. or lower, and further preferably 100° C. or lower.

The vinyl monomer components may be charged into a reaction container by any method. The components may be collectively charged into a reaction container at an early stage; may be separately or continuously charged into a reaction container; or may be partially charged into a reaction container at an early stage, and the others may be separately or continuously charged into the reaction container. The radical polymerization initiator and the chain transfer agent may be charged into a reaction container from the beginning, may be dropwise added to a reaction container, or may be charged in the combination manner depending on its purpose.

The polymerization reaction is preferably made to stably proceed in order to provide a copolymer with a predetermined molecular weight at good reproducibility. Thus, the dissolved oxygen concentration at 25° C. in the solvent to be used is preferably 5 ppm or lower (preferably 0.01 to 4 ppm, more preferably 0.01 to 2 ppm, and further preferably 0.01 to 1 ppm) in the solution polymerization. In the case that processes such as nitrogen substitution is performed after addition of the vinyl monomer components to the solvent, the dissolved oxygen concentration in the system including the vinyl monomer components is preferably in the above range.

The dissolved oxygen concentration of the solvent may be adjusted in a polymerization reaction tank, or may be adjusted preliminarily. Oxygen in the solvent may be removed by the following methods (1) to (5), for example.

(1) Inert gas such as nitrogen is introduced into an air-tightening container with a solvent charged therein under pressure, and then the pressure in the air-tightening container is decompressed so that the partial pressure of oxygen in the solvent is reduced. In this case, the pressure in the air-tightening container may be reduced under nitrogen flow.

(2) The liquid phase in the container with a solvent charged therein is stirred hard for a long time, while the gas phase in the container is replaced by inert gas such as nitrogen.

(3) Inert gas such as nitrogen is bubbled for a long time into the solvent in a container.

(4) The solvent is boiled, and then cooled down under inert gas atmosphere such as nitrogen.

(5) A static mixer is placed at the middle of a piping, and the solvent is mixed with inert gas such as nitrogen in the piping that transfers the solvent to the polymerization reaction tank.

The multi-branched polyalkylene glycol polymer produced by the above polymerization reaction may be easily handled by adjusting its pH so as not to be smaller than a value indicating weak acidity (more preferably adjusting its pH to 4 or higher, further preferably 5 or higher, and particularly preferably 6 or higher) in an aqueous solution state.

While if polymerization reaction is performed with a solution having a pH of 7 or higher the polymerization rate may be low and the copolymerizability may be insufficient. For example, the polymer may insufficiently show its dispersibility in the case of being used for an admixture for cement. Thus, the polymerization reaction is preferably performed with a solution having a pH value indicating acidity to neutral (more preferably pH of lower than 6, more preferably pH of lower than 5.5, and further preferably pH of lower than 5). Examples of a preferable polymerization initiator which makes the polymerization system acidic to neutral include persulfites such as ammonium persulfite, sodium persulfite, and potassium persulfite; water-soluble azo initiators such as azoamidine compounds e.g. azobis-2-methyl-propionamidine hydrochloride; hydrogen peroxide; and combinations of hydrogen peroxide and organic reductants. More preferably, at least an azo initiator is used as mentioned above.

Therefore, the pH of the polymer is preferably adjusted to be high by adding a substance such as an alkaline substance after the polymerization reaction with a low-pH solution. Specific examples of such a method include: a method in which the polymerization reaction is performed with a solution having a pH of lower than 6 and then the pH of the polymer is adjusted to 6 or higher by adding an alkaline substance; a method in which the polymerization reaction is performed with a solution having a pH of lower than 5 and then the pH of the polymer is adjusted to 5 or higher by adding an alkaline substance; and a method in which the polymerization reaction is performed with a solution having a pH of lower than 5 and the pH of the polymer is adjusted to 6 or higher by adding an alkaline substance.

The pH may be adjusted with an alkaline substance, such as inorganic salts e.g. hydroxides of monovalent metals and divalent metals and carbonates; ammonia; and organic amines. In the case that the pH is required to be lowered, especially the pH is required to be adjusted upon polymerization, the pH may be adjusted with an acidic substance, such as phosphoric acid, sulfuric acid, nitric acid, alkylphosphoric acids, alkylsulfuric acids, alkylsulfonic acids, and (alkyl)benzene sulfonic acids. Preferable among these acidic substances are phosphoric acid due to its pH buffer performance and sulfuric acid due to it ability to lower the pH at a small amount. In addition, the concentration may be adjusted if necessary after the reaction.

The reaction products of the polymerization reaction may include various polymers as the aforementioned sub-products in addition to the multi-branched polyalkylene glycol polymer. Thus, the method may include the steps of isolating the polymers, if necessary. In general, the polymers may be used without isolation for various applications in order not to deteriorate working efficiency and not to increase production cost.

<Polyalkylene Glycol Chain-Containing Thiol Compound>

The polyalkylene glycol chain-containing thiol compound of the present invention has a structure in which one end of the polyalkylene glycol chain bonds to a residue of the compound having three or more active hydrogen atoms and at least one of the other ends of the polyalkylene glycol chain bonds to a mercapto group (a thiol group, an SH group) via a group having a carbonyl group. This polyalkylene glycol chain-containing thiol compound is also referred to as the polyalkylene glycol chain-containing thiol compound (II). The multi-branched polymer having a polyalkylene glycol chain can be produced by polymerizing vinyl monomer components in the presence of such a polyalkylene glycol chain-containing thiol compound (II). The polymer thus obtained is one preferable aspect of the aforementioned multi-branched polyalkylene glycol polymer (i) of the present invention.

Here, the above polyalkylene glycol chain (that is, the polyalkylene glycol chain bonding to the residue of the compound having three or more active hydrogen atoms and the group having a carbonyl group) is referred to as the polyalkylene glycol chain (1).

In the above structure, the residue of the compound having active hydrogen atoms is a group formed by removing active hydrogen atoms from the compound having active hydrogen atoms, and the active hydrogen is hydrogen that is capable of receiving an alkylene oxide. One species or two or more species of such a residue of the compound having three or more active hydrogen atoms may be used in the present invention.

The preferable upper and lower limits of the number of the active hydrogen atoms in the compound having active hydrogen atoms, the preferable structure of the residue of the compound having active hydrogen atoms, and the like are the same as those mentioned in the description about the multi-branched polyalkylene glycol polymer (i). The residue of the compound having three or more active hydrogen atoms preferably bonds to two or more polyalkylene glycol chains (1) each of which bonds to a mercapto group via the group having a carbonyl group. In other words, the number of the polyalkylene glycol chains (1) to which the compound having three or more active hydrogen atoms bonds is preferably 2 or more, and more preferably 3 or more. In the case that the number thereof is 3 or more, the polyalkylene glycol chain-containing thiol compound is to have a radially multi-branched structure, that is, a structure in which the polyalkylene glycol chains (1) radially extend from the residue of the compound having three or more active hydrogen atoms. The compound having such a structure is capable of providing an admixture for cement which can show extremely high dispersibility.

The number of the polyalkylene glycol chains (1) to which the compound having three or more active hydrogen atoms bond is preferably the same as the number of the active hydrogen atoms in the compound having three or more active hydrogen atoms. In other words, the polyalkylene glycol chain-containing thiol compound preferably has a structure in which all the active hydrogen atoms in the compound having three or more active hydrogen atoms bond to the polyalkylene glycol chains. The compound having such a structure is capable of providing an admixture for cement that can show much better dispersibility. Thus, the compound may be used for various applications. The above formulas (A) and (B) schematically show this structure.

In the polyalkylene glycol chain-containing thiol compound, the polyalkylene glycol chain (1) bonds to the residue of the compound having three or more active hydrogen atoms. Details of the polyalkylene glycol chain (1) and the alkylene oxide constituting the chain (preferable structures and the like) are the same as those mentioned above about the multi-branched polyalkylene glycol polymer (i). The average number of alkylene oxides repeated in the polyalkylene glycol chain (1) (the average number of moles of oxyalkylene groups added) is also the same as that mentioned about the multi-branched polyalkylene glycol polymer (i). The "average number of alkylene oxides repeated (the average number of moles of oxyalkylene groups added)" herein means an average molar value of the alkylene oxides added per mole of the polyalkylene glycol chain (1) of the polyalkylene glycol chain-containing thiol compound.

In the polyalkylene glycol chain-containing thiol compound, the group having a carbonyl group bonds to the polyalkylene glycol chain (1). The group having a carbonyl group include not only groups each having a carbonyl group in a narrow sense (—C(O)—), but also groups each having a group such as an amido group (—N(H)—C(O)—).

The group having a carbonyl group is preferably a group comprising an organic residue with a molecular weight of 1,000 or lower and a carbonyl group (including a carbonyl group in a narrow sense and an amido group). An organic residue with a molecular weight of more than 1,000 may cause difficulty in the production, and thus a mercapto group and the polyalkylene glycol chain (1) are not stably bonded to each other. The molecular weight thereof is more preferably 300 or lower, and further preferably 200 or lower.

The organic residue herein means an organic group that bonds to the basic structure of a group or a compound. Examples thereof include C1-C18 straight, branched, and cyclic alkylene groups and C6-C11 aromatic groups (e.g. a phenyl group, alkyl phenyl groups, a pyridinyl group, thiophene, pyrrole, furan, and thiazol). Preferable among these are groups having C1-C8 hydrocarbon groups for good reactivity, more preferable are groups having C1-C6 hydrocarbon groups, further preferably C1-C6 hydrocarbon groups, and particularly preferably C1-C6 branched alkylene groups and C6 aromatic groups. The carbon number is preferably 2 or more for good hydrolysis resistance. Most preferable are C2-C6 branched alkylene groups and C6 aromatic groups, such as divalent organic residues derived from mercapto isobutylic acid and thio salicylic acid.

The organic residue may be partially substituted by a group such as a hydroxy group, an amino group, a cyano group, a carbonyl group, a carboxyl group, a halogen group, a sulfonyl group, a nitro group, and a formyl group.

The carbon atom in the carbonyl group (or a —CO group in the amido group) and the terminal oxygen atom in the polyalkylene glycol chain are preferably adjacent to each other at the bonding site between the group having a carbonyl group and the polyalkylene glycol chain (1). In other words, the polyalkylene glycol chain-containing thiol compound preferably has an ester bond derived from the group having a carbonyl group and the polyalkylene glycol chain. The polymer having such a structure is easily produced at low cost, and thus is useful for industrial production.

The polyalkylene glycol chain-containing thiol compound in more preferable aspect has a structure represented by the following formula (6):

[Chem. 9]

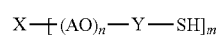

(6)

wherein X is a residue of the compound having three or more active hydrogen atoms; each AO is a C2-C18 oxyalkylene group, and the AOs may be the same as or different from each other; each Y is an organic residue having a carbonyl group or an amido group; the terminal oxygen atom of the oxyalkylene group represented by AO and the carbon atom in a carbonyl group or an amido group are adjacent to each other; each n is an average number of moles of oxyalkylene groups added, is 5 to 1,000, and the ns are the same as or different from each other; and m is an integer of 1 to 50.

In formula (6), the residue of the compound having three or more active hydrogen atoms represented by X, the C2-C18 oxyalkylene group represented by AO, the organic residue having a carbonyl group or an amido group represented by Y, and the average number of moles of oxyalkylene groups added represented by n are the same as those mentioned above. In addition, m is the number of the polyalkylene glycol chains (1) each bonding, via the group having a carbonyl group, to a mercapto group to each of which the compound having three or more active hydrogen atoms represented by X bonds, and this is also the same as that mentioned above.

The polyalkylene glycol chain-containing thiol compound may further have a polyalkylene glycol chain that does not bond to a mercapto group.

The end of such a polyalkylene glycol chain (the end opposite to the residue of the compound having three or more active hydrogen atoms) preferably bonds to any one of a hydrogen atom, a monovalent metal atom, a divalent metal atom, an ammonium group, an organic amine group, a C1-C30 hydrocarbon group, an oxo hydrocarbon group, an amido hydrocarbon group, a carboxyl hydrocarbon group, and a C0-C30 sulfonyl (hydrocarbon) group. In the case that the compound has two or more polyalkylene glycol chains in question per molecule, the end structures thereof may be the same as or different from each other. Preferable among these end structures are a hydrogen atom and a C1-C30 hydrocarbon groups due to their multiple usage, and more preferable are a hydrogen atom and C1-C10 hydrocarbon groups. Preferable among the C1-C10 hydrocarbon groups are alkyl groups and alkylene groups.

In the case that the polyalkylene glycol chain-containing thiol compound is the compound represented by formula (6), the compound may be a compound represented by the following formula (7):

[Chem. 10]

(7)

wherein X, AO, Y, n, and m are the same as those mentioned in formula (6), each n' is an average number of moles of oxyalkylene groups added and is 1 to 1,000, the ns' may be the same as or different from each other, preferably has the same structure as that of n, and n and n' may be the same as or different from each other; Q is a hydrogen atom or a C1-C10 alkyl group or alkylene group; p is an integer of 0 or greater, and the maximum value thereof depends on the number of the active hydrogen atoms in the compound having three or more active hydrogen atoms represented by X and the value of m.

Here, p is the value whose maximum value depends on the number of the active hydrogen atoms in the compound having three or more active hydrogen atoms represented by X and the value of m. The value represented by p is preferably not smaller than [(the total number of the active hydrogen atoms in the compound having three or more active hydrogen atoms)-3] for the purpose of adjusting the number of the polyalkylene glycol chains (1) to which the compound having three or more active hydrogen atoms bonds to 3 or more and thereby sufficiently achieving the effects owing to the polyalkylene glycol chains (1) each bonding to a mercapto group via the group having a carbonyl group.

The polyalkylene glycol chain-containing thiol compound also preferably satisfies at least one of the structures (II-1) at least one terminal unit on the side of the group having a carbonyl group of the polyalkylene glycol chain (1) is an oxyalkylene group having three or more carbon atoms, and (II-2) the group having a carbonyl group has a carbonyl group and a tertiary or quaternary carbon atom bonding to the carbonyl group. As mentioned here, the structure in which at least one terminal unit on the side of the group having a carbonyl group of the polyalkylene glycol chain is an oxyalkylene group having three or more carbon atoms, or the group having a carbonyl group has a carbonyl group and a tertiary or quaternary carbon atom bonding to the carbonyl group is also one preferable aspect of the present invention.

Such a structure gives the polyalkylene glycol chain-containing thiol compound extremely excellent hydrolysis resistance, and thus the compound is capable of sufficiently showing the effects derived from the structure of the compound in various applications.

In the above structure (II-1), at least one alkylene glycol unit of the terminal group on the side of the group having a carbonyl group of the polyalkylene glycol chain (1) is an oxyalkylene group having three or more carbon atom. The oxyalkylene group having three or more carbon atoms is preferably a C3-C18 oxyalkylene group, and in particular, it is more preferably a C3-C8 oxyalkylene group, for example. Examples thereof include an oxypropylene group, an oxybutylene group, an oxystyrene group, and alkylglycidyl ether residues. More preferable are an oxypropylene group and an oxybutylene group for easy productivity.

The oxyalkylene group having three or more carbon atoms on the end of the polyalkylene glycol chain (1) is also preferably a group derived from a secondary alcohol residue. Here, the polyalkylene glycol chain-containing thiol compound preferably has an ester bond formed by the carbonyl group (—CO—) in the group having a carbonyl group and the terminal oxygen atom (—O—) in the polyalkylene glycol chain (1) as mentioned above. The bond is more preferably formed between the tertiary or quaternary carbon atom derived from the secondary alcohol residue and the oxygen atom forming the above ester bond (that is, the terminal oxygen atom in the polyalkylene glycol chain (1) bonding to the carbonyl group in the group having a carbonyl group). Such a bond gives much better hydrolysis resistance.

Although the amount of the oxyalkylene group having three or more carbon atoms introduced depends on the degree of the required hydrolysis resistance, it is preferably 50 mol % or higher if the number of the ends of the polyalkylene glycol chains (1) is regarded as 100 mol %. The amount is more preferably 100 mol % or higher, further preferably 150 mol % or higher, and particularly preferably 200 mol % or higher.

In the structure (II-2), the group having a carbonyl group has a carbonyl group and a tertiary or quaternary carbon atom bonding to the carbonyl group. In other words, the carbon atom forming the ester bond (ester bond formed by the terminal oxygen atom of the polyalkylene glycol chain (1) and the carbonyl group in the group having a carbonyl group) preferably bonds to a tertiary or quaternary carbon atom.

In this case, the group having a carbonyl group is preferably a group formed by the bond between a C2-C6 branched alkylene group or a C6 aromatic group and a carbonyl group (a carbonyl group in a narrow sense or an amido group). The group having a carbonyl group is more preferably a group derived from mercapto isobutylic acid or thio salicylic acid (the group having a divalent organic residue and a carbonyl group).

The particularly preferable structure among the above structures (II-1) and (II-2) of the polyalkylene glycol chain-containing thiol compound of the present invention is a structure in which the carbon atom and/or the oxygen atom forming the ester bond (that is, the ester bond formed by the terminal oxygen atom of the polyalkylene glycol chain (1) and the carbonyl group in the group having a carbonyl group) bonds to a tertiary or quaternary carbon atom. Such a specified structure gives further improved hydrolysis resistance, and the effects owing to the thiol-modified monomers of the present invention are further exerted.

<Method for Producing Polyalkylene Glycol Chain-Containing Thiol Compound>

The present invention is also a method for producing the polyalkylene glycol chain-containing thiol compound (ii). The method is also a method for producing a polyalkylene glycol chain-containing thiol compound comprising the step of dehydration-condensing a compound formed by adding an alkylene oxide to the compound having three or more active hydrogen atoms and a thiol compound having a carboxyl group.

In the method for producing a polyalkylene glycol chain-containing thiol compound, examples of the compound having three or more active hydrogen atoms preferably include polyhydric alcohols, polyamines, polyimines, and polyamide compounds as mentioned above. Particularly preferable among these are polyamines, polyalkylene imines, and polyhydric alcohols. These are as mentioned above.

The alkylene oxides are also as mentioned above.

The reaction molar ratio between the compound having three or more active hydrogen atoms and the alkylene oxide is preferably appropriately adjusted such that the average number of alkylene oxides repeated in the polyalkylene glycol chain is in the preferable range mentioned above.

The alkylene oxide may be added to the compound having three or more active hydrogen atoms by a common polymerization technique, and may be preferably achieved with an acid catalyst or an alkaline catalyst. Examples of the acid catalyst include halogenated compounds of metals and metalloids which are Lewis acid catalysts e.g. boron trifluoride; mineral acids such as hydrogen chloride, hydrogen bromide, and sulfuric acid; and paratoluene sulfonic acid. Examples of the alkaline catalyst include potassium hydroxide, sodium hydroxide, and sodium hydride.

The reaction time of the addition reaction step may be appropriately adjusted depending on the kind and amount of a catalyst to be used, the number of moles of the alkylene oxides added to the compound having three or more active hydrogen atoms, and the concentration of the solution. Here, the compound formed by adding the alkylene oxide to the compound having three or more active hydrogen atoms (hereinafter, also referred to simply as the "adduct") may be a commercially available compound.

In the above production method, the compound formed by adding the alkylene oxide to the thus obtained compound having three or more active hydrogen atoms is dehydration-condensed with a thiol compound having a carboxyl group (hereinafter, also referred to simply as the "thiol compound").

In the dehydration-condensation, the carboxyl group-containing thiol compound is not limited as long as it is a compound having a mercapto carboxylic group that has a carboxyl group (carboxylic group) and a mercapto group per molecule.

Examples of such a mercapto carboxylic group-containing compound include thio glycolic acid, 2-mercapto propionic acid, 3-mercapto propionic acid, mercapto isobutylic acid, thio malic acid, thio salicylic acid, mercapto stearic acid, mercapto acetic acid, mercapto butyric acid, mercapto octanoic acid, mercapto benzoic acid, mercapto nicotinic acid, cysteine, N-acetyl cysteine, and mercapto thiazol acetic acid. Particularly preferable are thio glycolic acid, 3-mercapto propionic acid, thio malic acid, thio salicylic acid, and mercapto isobutylic acid.

In the case that the polyalkylene glycol chain-containing thiol compound of the present invention satisfies the structure (II-1), it may be produced from the compound formed by adding an alkylene oxide having three or more carbon atoms as the alkylene oxide used in the method for producing a polyalkylene glycol chain-containing thiol compound.

Upon adding the alkylene oxide to the compound having three or more active hydrogen atoms, at least one compound selected from the group consisting of alkaline metals, alkaline earth metals, and oxides and hydroxides thereof is preferably used as a catalyst for an increased introduction ratio of the oxyalkylene group having three or more carbon atoms (more preferably a secondary alcohol residue). The compound is more preferably sodium hydroxide, potassium hydroxide, magnesium hydroxide, or calcium hydroxide. It is most preferably sodium hydroxide or potassium hydroxide.

The reaction temperature upon the addition reaction is preferably 50° C. to 200° C. for an increased introduction ratio of these groups. It is more preferably 70° C. to 170° C., further preferably 90° C. to 150° C., and particularly preferably 100° C. to 130° C.

As mentioned above, the particularly preferable structure of the polyalkylene glycol chain-containing thiol compound satisfying the structure (II-1) is that at least one terminal unit of the polyalkylene glycol chain (1) is an oxyalkylene group having three or more carbon atoms derived from a secondary alcohol residue, and a tertiary or quaternary carbon atom derived from the secondary alcohol residue bonds to the oxygen atom (the terminal oxygen atom in the polyalkylene glycol chain (1)) forming the ester bond (the ester bond formed by the terminal oxygen atom of the polyalkylene glycol chain (1) and the carbonyl group in the group having a carbonyl group). Such a polyalkylene glycol chain-containing thiol compound may be primarily produced by reacting a compound derived from the secondary alcohol residue as the alkylene oxide having three or more carbon atoms and a hydroxide of an alkaline metal or an alkaline earth metal as the catalyst at low temperature in the addition reaction. More preferable as the catalyst to be used are sodium hydroxide, potassium hydroxide, magnesium hydroxide, and calcium hydroxide, and most preferable are sodium hydroxide and potassium hydroxide. The reaction temperature is preferably 50° C. to 200° C. It is more preferably 70° C. to 170° C., further preferably 90° C. to 150° C., and particularly preferably 100° C. to 130° C.

The polyalkylene glycol chain-containing thiol compound satisfying the above structure (II-2) may be produced by using a mercapto carboxylic acid having a tertiary or quaternary carbon atom on the side of the carboxyl group as a thiol compound in the aforementioned method for producing the polyalkylene glycol chain-containing thiol compound of the present invention. Examples of such a mercapto carboxylic acid include mercapto isobutyl acid and thio salicylic acid.

In the dehydration-condensation between the adduct and the thiol compound, the dehydration-condensation reaction preferably occurs between the hydroxy group of the adduct and the carboxyl group of the thiol compound. Such a reaction may be performed by a common ester reaction in the liquid phase. The reaction may be performed under reduced pressure or with an entrainer such as xylene.

The dehydration-condensation is preferably performed in the presence of an acid catalyst considering the properties of the mercapto group in the thiol compound. The acid catalyst is as mentioned above.

As mentioned here, the dehydration-condensation between the adduct and the thiol compound is preferably an esterification reaction with an acid catalyst.

The mixing ratio between the adduct and the thiol compound may be appropriately adjusted depending on the desired purity, cost, reaction rate, synthetic method, and the like of the polyalkylene glycol chain-containing thiol compound. In the case that a polyalkylene glycol chain-containing thiol compound with high purity is required to be produced in a short time, the molar ratio of the carboxyl group of the thiol compound is preferably greatly excessive to the amount of the hydroxy groups in the adduct to be used in the reaction. Specifically, the molar ratio thereof is preferably twice or more, and more preferably three or more times for good reaction rate. In addition, the molar ratio thereof is preferably 10 times or less, and more preferably 5 times or less for appropriate production cost. The crude reaction product may be used as it is obtained, or may be purified if necessary and unreacted components may be removed.

If it is favorable to reduce the amount of the thiol compounds that are unreacted materials remained after the reaction, the mixing ratio is preferably set such that the molar ratio of the carboxyl group of the thiol compound is preferably twice or less larger than the amount of the hydroxy groups in the adduct to be used in the reaction. Specifically, the molar ratio thereof is preferably 0.3 or more times, more preferably 0.5 or more times, further preferably 0.7 or more times, and particularly preferably 0.8 or more times for good yield. In addition, the molar ratio thereof is preferably 1.8 or less times, more preferably 1.6 or less times, further preferably 1.4 or less times, and particularly preferably 1.3 or less times for a decreased amount of remaining unreacted components. The crude reaction product may be purified if necessary; however, the amount of unreacted thiol compounds is small in this method. Thus, the process of removing the unreacted thiol compounds may be omitted, and thereby the production procedure may be simplified.

The reaction time of the dehydration-condensation may be appropriately adjusted depending on the kind and amount of an acid catalyst to be used, the mixing ratio between the adduct and the thiol compound, the concentration of the solution, and the like.

The above production method may further comprise the step of adjusting the pH of the reaction solution after the dehydration-condensation. Thereby, the generated ester is prevented from being hydrolyzed in the desolvation. The pH may be adjusted by putting an alkali such as sodium hydroxide aqueous solution into the reaction solution obtained in the dehydration-condensation. In order to suppress hydrolysis reaction, the pH of the reaction solution is preferably 3 or higher, and more preferably 4 or higher, while it is preferably 7 or lower, more preferably 6 or lower, and further preferably 5.5 or lower.

The crude reaction product obtained in the dehydration-condensation is preferably solidified by cooling down the reaction solution after the dehydration-condensation (that is, the reaction solution with its pH unadjusted) or the reaction solution with its pH adjusted to room temperature. Thereby, the crude reaction product is easily recovered from the reaction solution. The obtained solidified crude reaction product may be purified. In this case, the solidified crude reaction product may be dried and crushed, and then washed with a solvent into which impurities such as unreacted material compounds are dissolved but the thiol compound such as diethyl ether are not dissolved.

Here, the washing with the above solvent is preferably eliminated in order to avoid an increase in production cost due to addition of the step and the environmental load due to the use of a solvent. In this case, the mixing ratio between the adduct and the thiol compound that are the material compounds is preferably such that the molar ratio of the carboxyl group of the thiol compound is twice or less larger than that of the hydroxy group in the adduct to be used in the reaction as mentioned above.

The present inventors have found that, in the case of producing the polyalkylene glycol chain-containing thiol compound from the crude reaction product by drying the solidified crude reaction product obtained by the above production method and further washing this dried solidified product with diethyl ether and the like, the compound self-multimerizes to form a multimer, and the amount of the multimer may be more than 30% by weight for 100% by weight in total of the products in some cases. In addition, the present inventors have performed further studies to found that this multimerization is caused by drying the solidified crude reaction product even though the reaction passway is unclear. Thus, the present inventors have found that the multimerization proceeds when the compound is just in a dried state and whether or not in the vacuum state, as well as whether or not occurrence of dehydration reaction and neutralization reaction.

In the case that the polyalkylene glycol chain-containing thiol compound or the solution thereof is required to have a low viscosity, for example, the multimer is preferably in a small amount. In this case, the solidified crude reaction product is preferably not dried. Thereby, production of the multimer is effectively suppressed, and the amount of the multimer in the polyalkylene glycol chain-containing thiol compound is kept in the range of 1 to 30% by weight for 100% by weight of the compound.

In contrast, the amount of multimer may be greatly increased just by drying the crude reaction product for a predetermined time. The multimer probably has a polydisulfide structure such that two or more thiol compounds bond to each other by disulfidation of the mercapto groups and the residues of the polyalkylene glycol chain-containing thiol compound are repeated. Here, the disulfide bond, as well as a mercapto group, easily generates a radical by various methods. Thus, this multimer may be used as a chain transfer agent. In addition, the molecular weight of the multimer is reduced due to radical generation, and finally decomposed to the structure of the residue of the polyalkylene glycol chain-containing thiol compound. Thus, in the case that the multimer is used as a chain transfer agent in radical polymerization, the multimer before reaction has a high molecular weight and thus has a high viscosity, whereas the residue of the polyalkylene glycol chain-containing thiol compound after the reaction has a reduced molecular weight and thus has a lowered viscosity. As a result, the viscosity in the reaction system may be adjusted during the polymerization reaction, and may be used in applications other than those of the polyalkylene glycol chain-containing thiol compound.

As mentioned here, the structure in which the polyalkylene glycol chain-containing thiol compound includes a multimer as a sub-product is also one preferable aspect of the present invention.

The multimer may also be synthesized from the polyalkylene glycol chain-containing thiol compound by various methods. For example, the multimer may be produced by converting the mercapto group in the polyalkylene glycol chain-containing thiol compound into a radical by factors such as heat, light, radiation, and a radical generator, and converting it into disulfide via a sulfur radical, treating it with an oxidant, treating it with an alkali, or converting it into disulfide via a sulfur anion.

The following will describe the multimer of the polyalkylene glycol chain-containing thiol compound referring to the case that sorbitol is used as the compound having three or more active hydrogen atoms.

The following formula schematically shows the mode in which two mercapto groups form a disulfide bond to give a dimer in the case that the polyalkylene glycol chain-containing thiol compound is represented by the above formula (B) (the compound having three or more active hydrogen atoms is sorbitol and each active hydrogen of the sorbitol receives a mercapto group via the polyalkylene glycol chain and the group having a carbonyl group).

[Chem. 11]

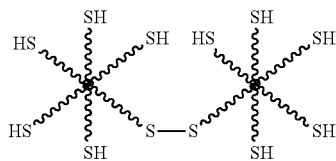

In the case that the amount of the multimer is required to be reduced for appropriate viscosity and the like properties in the production method, the method preferably comprises the step of adding an antioxidant. This is because one presumable cause of multimerization is occurrence of a heat radical from the mercapto group of the thiol compound due to the reaction between the adduct and the thiol compound under heating. Addition of an antioxidant that is capable of capturing a radical leads to effective suppression of multimerization due to occurrence of a heat radical from a mercapto group.

The addition of an antioxidant may be performed at any step in the production, such as dehydration-condensation, desolvation, and purification, or may be performed between the steps.

The antioxidant is not particularly limited and may be one commonly used. Examples thereof include: phenothiazine and derivatives thereof; phenol compounds such as hydroquinone, catechol, resorcinol, methoquinone, butyl hydroquinone, butyl catechol, naphthohydroquinone, dibutyl hydroxytoluene, butyl hydroxyanisole, tocopherol, tocotrienol, and catechin; nitro compounds such as tri-p-nitrophenylmethyl, diphenylpicrylhydrozine, and picric acid; nitroso compounds such as nitrosobenzene and cupferron; amine compounds such as diphenyl amine, di-p-fluorophenyl amine, and N-(3-N-oxyanilino-1,3-dimethyl-butylidene) aniline oxide; static radicals such as TEMPO radical (2,2,6,6-tetramethyl-1-piperidinyloxyl), diphenylpicryl hydradyl, galvinoxyl, and verdazyl; ascorbic acid and erythorbic acid, and salts and esters thereof; dithiobenzoyl disulfide; and cupric chloride. Each of these may be used alone or two or more of these may be used in combination. Preferable among these are phenothiazine and derivatives thereof, phenol compounds, ascorbic acid and erythorbic acid, and esters thereof. More preferable are phenothiazine, hydroquinone, and methoquinone. These antioxidants are useful because they extremely effectively inhibit polymerization in dehydration-condensation and solvent distillation.

The amount of the antioxidant is not particularly limited as long as the antioxidant effectively suppresses multimerization of the polyalkylene glycol chain-containing thiol compound. The amount thereof is preferably 10 ppm or more and 5,000 ppm or less in the weight of the antioxidant for the weight (solids content) of the polyalkylene glycol chain-containing thiol compound. The antioxidant in an amount in this range more sufficiently shows its effect while keeping the properties of the thiol compound. If the amount is more than 5,000 ppm, the thiol compound is not likely to sufficiently show its properties, and coloring may occur. The amount thereof is more preferably 20 ppm or more, further preferably 50 ppm or more, and particularly preferably 100 ppm or more. In addition, the amount thereof is more preferably 2,000 ppm or less, further preferably 1,000 ppm or less, and particularly preferably 500 ppm or less.

Even in the case that the method in which the reaction solution is heated so that the solvent is distilled off is employed as the method for producing a solidified crude reaction product from the reaction solution after the dehydration-condensation as mentioned here, the amount of the multimer in the polyalkylene glycol chain-containing thiol compound to be obtained is capable of being controlled to 30% by weight or less for 100% by weight of the compound by adding an antioxidant.

The solidified polyalkylene glycol chain-containing thiol compound obtained as mentioned above is likely to be multimerized when dried. Thus, it is preferably stored in a solution state. It is more preferably stored in an aqueous solution state. The pH of the solution is preferably set to 4 or higher, more preferably 5 or higher, further preferably 5.5 or higher, and particularly preferably 6 or higher. In addition, the pH is preferably set to 7 or lower.

The production method may also comprise the step of removing the multimer from the polyalkylene glycol chain-containing thiol compound because the polyalkylene glycol chain-containing thiol compound to be obtained is easily multimerized as mentioned above. The removing step may be performed by molecular weight fractionation such as dialysis, ultrafiltration, and gel permeation chromatography (GPC). Here, addition of the step of removing the multimer may cause an increase in production cost and the like. Thus, the polyalkylene glycol chain-containing thiol compound containing the multimer may be used in preparation of the polymer mentioned below, for example.

The polyalkylene glycol chain-containing thiol compound (ii) can be obtained by the aforementioned process. The polymer produced from such a compound is also one embodiment of the present invention. Such a polymer shows extremely high cement dispersibility owing to the steric repulsion of the polyalkylene glycol chain derived from the polyalkylene glycol chain-containing thiol compound, and thus is preferable for an admixture for cement. Thus, the polymer is useful for more various fields. In particular, the polymer produced by polymerizing the vinyl monomer components in the presence of the polyalkylene glycol chain-containing thiol compound (ii) is a particularly preferable mode of the aforementioned multi-branched polyalkylene glycol polymer (i) of the present invention. Details of the vinyl monomer components and the polymerization reaction are as mentioned above about the polymer (i).

By performing the polymerization in the presence of the polyalkylene glycol chain-containing thiol compound (ii) as mentioned above, a radical generated from a mercapto group by factors such as heat, light, and radiation or a radical generated by a polymerization initiator separately used as necessary chain-transfers to the mercapto group, or cleave a disulfide bond formed by the produced multimer and monomers successively attach thereto via the terminal sulfur atom (S) of the polyalkylene glycol chain-containing thiol compound to form a polymer. In the case that the monomer (a) and the monomer (b) (as well as monomer (c) if necessary) are used for polymerization as the vinyl monomer components, for example, the polymer including a constitutional unit having a carboxyl group derived from the monomer (a), a constitutional unit having a polyalkylene glycol chain derived from the monomer (b), and a constitutional unit derived from the monomer (c), if the monomer (c) is used, is mainly produced on the end of the polyalkylene glycol chain-containing thiol compound via the sulfur atom.

The multi-branched polyalkylene glycol polymer (i) of the present invention and the polymer produced from the polyalkylene glycol chain-containing thiol compound (II) of the present invention may be suitably used for various applications such as adhesives, sealants, flexibility-imparting components for various polymers, admixtures for cement, and builders for cleaning agents. In particular, they are preferably used for admixtures for cement because of their extremely high cement dispersibility as mentioned above. As mentioned here, the admixture for cement containing the multi-branched polyalkylene glycol polymer is also one aspect of the present invention. The admixture for cement may be used in admixture with cement compositions such as cement paste, mortar, and concrete. Such a cement composition containing the admixture for cement is also one aspect of the present invention.

The cement composition preferably contains ingredients such as cement, water, fine aggregate, and coarse aggregate. Examples of the cement include: Portland cements (ordinary, high early strength, ultrahigh early strength, middle-heat, sulfate-resistant, and low-alkaline types thereof); various mixed cement (blast furnace cement, silica cement, and fly-ash cement); white Portland cement; alumina cement; ultrarapid hardening cement (1 clinker rapid hardening cement, 2 clinker rapid hardening cement, and magnesium phosphate cement); grouting cement; oil well cement; low-heat cement (low-heat blast furnace cement, fly ash-mixed low-heat blast furnace cement, high belite-contented cement); ultrahigh strength cement; cement solidification material; and ecocement (cement produced from one or more such materials as municipal refuse incinerated ash and sludge incinerated ash), as well as those produced by adding finely powdered materials such as blast furnace slag, fly ash, cinder ash, clinker ash, husk ash, fumed silica, powdery silica, and powdery limestone and gypsum to the above species of cement.

Examples of the aggregate include gravel, rubble, granulated slag, and regenerated aggregate, as well as fireproof aggregates made from silica stone, clay, zircon, high alumina, silicon carbide, graphite, chromium, chrome-magnesite, and magnesia.

The unit water content, cement content, and water/cement ratio (weight ratio) per 1 $m^3$ of the cement composition is preferably as follows: unit water content of 100 to 185 kg/$m^3$; cement content of 200 to 800 kg/$m^3$; and water/cement ratio (weight ratio) of 0.1 to 0.7. They are more preferably as follows: unit water content of 120 to 175 kg/$m^3$; cement content of 250 to 800 kg/$m^3$; and water/cement ratio (weight ratio) of 0.2 to 0.65. As mentioned here, the admixture for cement containing the polymer (i) of the present invention may be used at a wide amount range from a small amount to a large amount. It may be used at a high water reducing ratio region, that is, a region with a water/cement ratio (weight ratio) as low as 0.15 to 0.5 (preferably 0.15 to 0.4). Further, it may be useful for high strength concrete with a large unit cement content and low water/cement ratio and poor-amount concrete with a unit cement content of 300 kg/$m^3$ or less.

The admixture for cement of the present invention shows high fluidity, retaining ability, and workability at good balance even in the high water reducing ratio region, and has excellent workability. Thus, it is capable of being effectively used for concrete such as ready mixed concrete, concrete for concrete secondary products (precast concrete), concrete for centrifugal molding, concrete for compaction by vibration, steam curing concrete, and spray concrete. In addition, it is also useful for mortar and concrete which are required to have high fluidity such as middle performance concrete (concrete with a slump value of 22 to 25 cm), high performance concrete (concrete with a slump value of 25 cm or higher and with a slump flow value of 50 to 70 cm), self-compacting concrete, and self-leveling materials.

In the case that the admixture for cement is used for a cement composition, the compounding ratio is preferably such that the polymer (i) that is an essential component of the present invention occupies 0.01 to 10% by weight (in solids content) for 100% by weight in total of the cement weight. If the amount thereof is less than 0.01% by weight, the composition may insufficiently show its performance, while if the amount is more than 10% by weight, the performance thereof may not be improved substantially and may be disadvantageous from the economical view. The amount thereof is more preferably 0.02 to 8% by weight, and further preferably 0.05 to 6% by weight.

The admixture for cement may be also used in combination with other additives for cement. Examples of the other additives for cement include the following additives (and materials) for cement, and each of these may be used alone or two or more of these may be used in combination. Particularly preferable among these is combination use of an oxyalkylene antifoaming agent and an AE agent.

The ratio of the additives for cement is preferably 0.0001 to 10 parts by weight for 100 parts by weight of the solids content of the polymer (i).

(1) Water-soluble polymer substances: unsaturated carboxylic acid compounds such as (sodium)polyacrylate, (sodium)polymethacrylate, (sodium)polymaleate, and a sodium salt of an acrylic acid/maleic acid copolymer; polymers of polyoxyethylene and polyoxypropylene, e.g. polyethylene glycol and polypropylene glycol, and copolymers thereof; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharides produced by microbial fermentation such as yeast glucan, xanthan gum, and β-1,3 glucans (which may be of straight chain or of branched chain, e.g. curdlan, paramylon, pachyman, scleroglucan, and laminaran); polyacrylamide; polyvinyl alcohol; starch; starch phosphate; sodium alginate; gelatin; and acrylic copolymers having an amino group in the molecule and quaternary compounds thereof.

(2) Polymeric emulsions.

(3) Retarders: oxycarboxylic acids and salts thereof such as gluconic acid, malic acid, and citric acid, and salts thereof with inorganic substances (e.g. sodium, potassium, calcium, magnesium, ammonium, and triethanol amine) and with organic substances; glucose, fructose, galactose, and saccharose; sugar alcohols such as sorbitol; magnesium silicofluoride; phosphoric acid and salts thereof, and borate esters; aminocarboxylic acids and salts thereof; alkali-soluble proteins; humic acid; tannic acid; phenol; polyhydric alcohols such as glycerin; and phosphonic acids and derivatives thereof such as aminotri(methylene phosphonic acid), 1-hydroxyethylidene-1,1-phosphonic acid, ethylenediaminetetra (methylene phosphonic acid), and diethylenetriaminepenta (methylene phosphonic acid), alkaline metal salts thereof, and alkaline earth metal salts thereof.

(4) Early strength agents/accelerators: soluble calcium salts such as calcium chloride, calcium nitrite, calcium nitrate, calcium bromide, and calcium iodide; alkanol amine; alumina cement; and calcium alminate silicate.

(5) Mineral oil-derived antifoaming agents: kerosene and fluid paraffin.

(6) Fats- and oils-derived antifoaming agents: animal and vegetable oils, sesame oil, castor oil, and adducts of these substances and alkylene oxides.

(7) Fatty acid-derived antifoaming agents: oleic acid, stearic acid, and adducts of these substances and alkylene oxides.

(8) Fatty acid ester-derived antifoaming agents: glycerin monoricinoleate, alkenyl succinic acid derivatives, sorbitol monolaurate, sorbitol trioleate, and natural wax.

(9) Oxyalkylene-derived antifoaming agents: polyoxyalkylenes such as (poly)oxyethylene (poly)oxypropylene adducts; (poly)oxyalkyl ethers such as diethylene glycol heptyl ether, polyoxyethylene oleyl ether, polyoxypropylene butyl ether, polyoxyethylene polyoxypropylene-2-ethylhexyl ether, and oxyethylene oxypropylene adducts to C12-C14 higher alcohols; (poly)oxyalkylene(alkyl)aryl ethers such as polyoxypropylene phenyl ether and polyoxyethylene nonylphenyl ether; acetylene ethers formed by addition-polymerizing alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleate ester, diethylene glycol laurate ester, and ethylene glycol distearate ester; (poly)oxyalkylene sorbitan fatty acid esters such as polyoxyethylene sorbitan monolaurate ester and polyoxyethylene sorbitan trioleate ester; (poly)oxyalkylene alkyl(aryl)ether sulfate ester salts such as polyoxypropylene methyl ether sodium sulfate and polyoxyethylene dodecylphenol ether sodium sulfate; (poly)oxyalkylene alkyl phosphate esters such as (poly)oxyethylene stearyl phosphate ester; (poly) oxyalkylene alkylamines such as polyoxyethylene laurylamine; and polyoxyalkylene amides.

(10) Alcohol-derived antifoaming agents: octyl alcohols, hexadecyl alcohols, acetylene alcohols, and glycols.

(11) Amido-derived antifoaming agents: acrylate polyamine.

(12) Phosphate ester-derived antifoaming agents: tributyl phosphate and sodium octyl phosphate.

(13) Metal soap-derived antifoaming agents: aluminum stearate and calcium oleate.

(14) Silicone-derived antifoaming agents: dimethyl silicone oil, silicone paste, silicone emulsion, organic modified polysiloxane (polyorganosiloxanes such as dimethyl polysiloxane), and fluorosilicone oil.

(15) AE agents: resin soaps, saturated or unsaturated fatty acids, sodium hydroxystearate, lauryl sulfate, ABS (alkyl benzene sulfonic acids), LAS (linear alkyl benzene sulfonic acids), alkane sulfonates, polyoxyethylene alkyl(phenyl) ethers, polyoxyethylene alkyl(phenyl)ether sulfate esters and the salts thereof, polyoxyethylene alkyl(phenyl)ether phosphate esters and the salts thereof, protein materials, alkenyl sulfosuccinates, and α-olefin sulfonate.

(16) Other surfactants: polyalkylene oxide derivatives formed by adding 10 or more moles of alkylene oxides, such as ethylene oxide and propylene propylene oxide, to aliphatic monohydric alcohols having 6-30 carbon atoms per molecule, such as octadecyl alcohol and stearyl alcohol, alicyclic monohydric alcohols having 6-30 carbon atoms per molecule, such as abiethyl alcohol, monovalent mercaptans having 6-30 carbon atoms per molecule, such as dodecyl mercaptane, alkyl phenols having 6-30 carbon atoms per molecule, such as nonyl phenol, amines having 6-30 carbon atoms per molecule, such as dodecyl amine, and carboxylic acids having 6-30 carbon atoms per molecule, such as lauric acid and stearic acid; alkyldiphenyl ether sulfonate salts in which two phenyl groups each having a sulfone group form an ether bond and which may have an alkyl group or an alkoxyl group as a substituent; anionic surfactants; cationic surfactants such as alkylamine acetate and alkyltrimethyl ammonium chloride; nonionic surfactants; and amphoteric surfactants.

(17) Waterproof agents: fatty acids (salts thereof), fatty acid esters, oils and fats, silicon, paraffin, asphalt, and wax.

(18) Rustproof agents: nitrites, phosphates, and zinc oxide.

(19) Crack-reducing agents: polyoxyalkyl ethers; and alkanediols such as 2-methyl-2,4-pentanediol.

(20) Expanding materials: ettringite-based materials and lime-based materials.

Examples of other additives (materials) for cement include wetting agents for cement, thickening agents, segregation-reducing agents, flocculants, drying shrinkage-reducing agents, strength-improving agents, self-leveling agents, rustproof agents, coloring agents, antifungal agents, blast furnace slag, fly ash, cinder ash, clinker ash, husk ash, fumed silica, powdery silica, and gypsum.

EFFECTS OF THE INVENTION

The multi-branched polyalkylene glycol polymer of the present invention has the aforementioned structure, and shows extremely good dispersibility. Thus, it is useful for various applications, especially for an admixture for cement. In addition, the method for producing a multi-branched polyalkylene glycol polymer of the present invention easily and efficiently produces such a multi-branched polyalkylene glycol polymer at low cost, and thus is an industrially very useful method. Further, the polyalkylene glycol chain-containing thiol compound of the present invention is particularly suitable as a material for such a multi-branched polyalkylene glycol polymer.

BRIEF DESCRIPTION OF THE DRAWING

FIG. 1 graphs decrease rates over time of the weight average molecular weight (Mw) at pH 7 shown in Table. 15.

MODE FOR CARRYING OUT THE INVENTION

The following will describe the present invention in more detail referring to, but not limited to, examples. All "parts" mean "parts by weight" and all "%" mean "% by mass" unless otherwise specified.

The following will first describe the procedure and analysis conditions of liquid chromatography (LC) and gel permeation chromatography (GPC) for the polyalkylene glycol chain-containing thiol compound, polymers thereof, and comparison polymers. Further, the following will also describe methods for determining their solids content.

<LC Procedure>

Device: Waters Alliance (2695)

Analysis software: Empower professional+GPC option, Waters Corp.

Column: Inertsil ODS-2 guard column+three columns (4.6 mm in inner diameter×250 mm), GL Sciences, Inc.

Detector: Differential refractive index (RI) detector (Waters 2414), multi-wavelength visible ultraviolet (PDA) detector (Waters 2996)

Eluent: Mixture of acetonitrile/100 mM acetic acid ion exchange aqueous solution at a ratio of 40/60 (% by mass) having a pH of 4.0 controlled with a 30% NaOH aqueous solution Flow rate: 0.6 mL/min Column temperature: 40° C.

Amount of sample solution injected: 100 μL (eluent solution with a sample concentration of 1% by mass)

<LC Analysis: Consumption Rate of Adduct and Average Number of Introduced SH>

The consumption rate of an adduct, which is a starting component, was roughly estimated as follows.

LC analysis gives peaks of a substance with no mercapto group introduced thereinto (unreacted starting material), a polyalkylene glycol chain-containing thiol compound (hereinafter, also referred to as the "PAG thiol compound") with one mercapto group introduced thereinto, . . . , and a PAG thiol compound with (m+p) mercapto groups introduced thereinto. The RI (differential refractive index) area ratios (%) of these compounds were defined as $S_0$, $S_1$, . . . , and $S_{m+p}$, respectively, and the consumption rate of the starting adduct was roughly estimated by the following formula 1.

$$\text{Consumption rate of starting adduct} = \frac{100\% - (\text{Starting adduct area})}{\text{The sum of starting adduct area and PAG thiol compound areas}} = 100\% - \left( S_0 \Big/ \sum_{i=0}^{m+p} S_i \right) \quad \text{(Formula 1)}$$

The average number of introduced SHs in the PAG thiol compound was roughly estimated by the following formula 2.

$$\text{Average number of introduced } SH = \sum_{i=0}^{m+p} iS_i \Big/ \sum_{i=0}^{m+p} S_i \quad \text{(Formula 2)}$$

<GPC Procedure>

The weight average molecular weights of the polyalkylene glycol chain-containing thiol polymers and comparison polymers were determined under the following conditions.

Device: Waters Alliance (2695)

Analysis software: Empower professional+GPC option, Waters Corp.

Column: TSK guard columns SWXL+TSK gel G4000SWXL+G3000SWXL+G2000SWXL, TOSOH Corp.

Detector: Differential refractive index (RI) detector (Waters 2414), multi-wavelength visible ultraviolet (PDA) detector (Waters 2996)

Eluent: prepared by dissolving sodium acetate trihydrate (115.6 g) into a mixture solvent of water (10,999 g) and acetonitrile (6,001 g) and adjusting the pH of the mixture to 6.0 with acetic acid Standard substance for preparing calibration curve: polyethylene glycols (peak top molecular weights (Mp): 272,500, 219,300, 107,000, 50,000, 24,000, 12,600, 7,100, 4,250, and 1,470)

Calibration curve: Third-order calibration curve prepared based on the Mp values of the above polyethylene glycols and elution times thereof.

Flow rate: 1 mL/min

Column temperature: 40° C.

Measurement time: 45 minutes

Amount of sample solution injected: 100 μL (eluent solution with a PAG concentration of 0.4% by mass, eluent solution with a PAG thiol compound concentration of 0.4% by mass, and eluent solution with a polymer concentration of 0.5% by mass)

<GPC Analysis Conditions 1 (Analysis of PAG Thiol Compound (Monomer)>

In the RI chromatogram, a flat and stable portion in the base line before elution was connected to another flat and stable portion in the base line after elution by a straight line, and thus the peak was detected and analyzed. In the case that a multimer peak or an impurity peak overlapped with a target peak, the overlapping portion was splitted by dropping a perpendicular line from the curve bottom in the overlapping portion, and the molecular weight of the target was determined.

Calculations of monomer purity content and multimer content:

Calculated as follows based on a ratio of the peak areas determined with the RI detector.

Monomer purity content=(PAG thiol compound area)/(multimer peak area+PAG thiol compound area)

Multimer content=(multimer peak area)/(multimer peak area+PAG thiol compound area)

<GPC Analysis Conditions 2 (Analysis of Polymer)>

In the obtained RI chromatogram, a flat and stable portion in the base line before polymer elution was connected to a flat and stable portion in the base line after polymer elution by a straight line, and thus the peak was detected and analyzed. In the case that the peak of a monomer or an impurity derived from the monomer overlapped with a polymer peak, a perpendicular line was dropped from the curve bottom in the overlapping portion to split the polymer portion from the monomer portion, and only the polymer portion was determined for the molecular weight and the distribution thereof. In the case that the polymer portion coincides with another portion and could not be splitted therefrom, these portions were together used for calculation.

Calculation of polymer purity content: Calculated as follows based on a ratio of the peak areas determined with the RI detector.

Polymer purity content=(polymer peak area)/(polymer peak area+monomer or impurity peak area)

<Determination of Solids Content (Analysis of PAG Thiol Compound and Polymer)>

A sample (about 0.5 g) was weighed out on an aluminum plate and diluted with water (about 1 g) to be uniformly spread. The diluted sample was dried for 1 hour at 130° C. under nitrogen atmosphere, and left to be cooled down in a desiccator. Then, the mass after drying was weighed. The solids content (non-volatile content) concentration was calculated from a difference in mass between before and after the drying.

The solids content determined in the above procedure was employed as the concentration of aqueous solutions of a PAG thiol compound or a polymer unless otherwise specified.

SYNTHESIS EXAMPLE OF ADDUCT (MULTI-BRANCHED ALCOHOL)

Synthesis Example 1

TMP→TMP-30

Trimethylolpropane (Wako Pure Chemical Industries, Ltd., 200 g, hereinafter also referred to as "TMP") and a 30% sodium hydroxide aqueous solution (3.62 g) were charged into a pressure-resistant reaction vessel equipped with a stirrer. The temperature of the reaction system was heated up to 100° C. with an oil bath. The pressure of the reaction system was reduced to 100 mmTorr for 1 hour with a vacuum pump while nitrogen was slowly bubbled into the reaction system, and thereby water (2.53 g) was distilled off. The pressure was further kept at 100 mmTorr for 1 hour with a vacuum pump. Then, the temperature inside the vessel was heated up to 130° C., and the inner pressure was adjusted to 0.5 MPa by nitrogen introduction. While the temperature inside the vessel was kept at 130° C.±2° C., ethylene oxide (1,969.9 g, 30-fold in mole relative to TMP) was added. Here, the inner pressure was controlled so as not to exceed 0.8 MPa. After the ethylene oxide addition, the inner temperature was kept at 130° C. for 1 hour to complete the reaction. The yield was found to be 99.7% from the masses before and after the reaction. As a result, the reaction provided a trimethylol propane ethylene oxide 29.9 mol adduct (hereinafter, also referred to as "TMP-30").

Synthesis Example 2

TMP-30→TMP-225

A reaction was carried out in the same manner as in Synthesis Example 1 except that TMP-30 (300 g), a 30% sodium hydroxide aqueous solution (2.97 g), and ethylene oxide (1,784.7 g, 196-fold mole relative to TMP-30) were used as starting materials. The yield was 99.6%. The reaction provided a trimethylol propane ethylene oxide 225 mol adduct (hereinafter, also referred to as "TMP-225").

Synthesis Example 3

TMP-30→TMP-330

A reaction was carried out in the same manner as in Synthesis Example 1 except that TMP-30 (200 g), a 30% sodium hydroxide aqueous solution (3.05 g) and ethylene oxide (1,827.8 g, 301.1-fold mole relative to TMP-30) were used as starting materials. The yield was 99.7%. The reaction provided a trimethylol propane ethylene oxide 330 mol adduct (hereinafter, also referred to as "TMP-330").

Synthesis Example 4

TMP-225→TMP-465

A reaction was carried out in the same manner as in Synthesis Example 1 except that TMP-225 (1,000 g), a 30% sodium hydroxide aqueous solution (1.77 g) and ethylene oxide (1,059.0 g, 241.5-fold mole relative to TMP-225) were used as starting materials. The yield was 99.7%. The reaction provided a trimethylol propane ethylene oxide 465 mol adduct (hereinafter, also referred to as "TMP-465").

Synthesis Example 6

SB→SB-30

Sorbitol (Wako Pure Chemical Industries, Ltd., 250 g, hereinafter, also referred to as "SB") and a 30% sodium hydroxide aqueous solution (3.44 g) were charged into a pressure-resistant reaction vessel equipped with a stirrer. The temperature of the reaction system was heated to 130° C. with an oil bath. The pressure of the reaction system was reduced to 100 mmTorr for 1 hour with a vacuum pump while nitrogen was slowly bubbled into the reaction system, and thereby water was distilled off. The pressure was further kept at 100 mmTorr for 1 hour with a vacuum pump. Then, the inner pressure was adjusted to 0.5 MPa by nitrogen introduction. While the inner temperature was kept at 130° C.±2° C., ethylene oxide (1,813.6 g, 30-fold mole relative to SB) was added. The inner pressure was controlled so as not to exceed 0.8 MPa. After the ethylene oxide addition, the inner temperature was kept at 130° C. for 1 hour to complete the reaction. The yield was found to be 99.7% from the masses before and after the reaction. The reaction provided a sorbitol ethylene oxide 29.9 mol adduct (hereinafter, also referred to as "SB-30").

Synthesis Example 7

SB-30→SB-120

A reaction was carried out in the same manner as in Synthesis Example 6 except that SB-30 (600 g), a 30% sodium hydroxide aqueous solution (2.66 g), and ethylene oxide (1,595.4 g, 90.5-fold mole relative to SB-30) were used as starting materials. The yield was 99.7%. The reaction provided a sorbitol ethylene oxide 120 mol adduct (hereinafter, also referred to as "SB-120").

Synthesis Example 8

SB-120→SB-300

A reaction was carried out in the same manner as in Synthesis Example 6 except that SB-120 (800 g), a 30% sodium hydroxide aqueous solution (1.94 g), and ethylene oxide (1,166.5 g, 181-fold mole relative to SB-30) were used as starting materials. The yield was 99.7%. The reaction provided a sorbitol ethylene oxide 300 mol adduct (hereinafter, also referred to as "SB-300").

Synthesis Example 9

SB-30→SB-60

A reaction was carried out in the same manner as in Synthesis Example 6 except that SB-30 (600 g), a 30% sodium hydroxide aqueous solution (0.90 g), and ethylene oxide (537.7 g, 30.5-fold mole relative to SB-30) were used as starting materials. The yield was 99.7%. The reaction provided a sorbitol ethylene oxide 60 mol adduct (hereinafter, also referred to as "SB-60").

Synthesis Example 10

SB-300→SB-300+12BO

A reaction was carried out in the same manner as in Synthesis Example 8 except that SB-300 (800 g) in Synthesis Example 8 and butylene oxide (51.0 g) were used as starting materials, a 30% sodium hydroxide aqueous solution was not used, and the reaction temperature was 125° C. The yield was 99.7%. The reaction provided a sorbitol ethylene oxide 300 mol+butylene oxide 12 mol adduct (hereinafter, also referred to as "SB-300+12BO").

<Polyalkylene Glycol Chain-Containing Thiol Compound (PAG Thiol Compound)>

Example M-1

(1) Dehydration Esterification

Polyalkylene glycol chain-containing triol in which 225 mol of ethylene oxide was added to 1 mol of trimethylol propane (TMP-225, 250.00 g), 3-mercaptopropionic acid (3-MPA, 8.72 g), p-toluenesulfonic acid monohydrate (PTS, 5.17 g), phenothiazine (PTZ, 0.0517 g), and cyclohexane (12.94 g) were charged into a glass reaction vessel equipped with a Dean Stark apparatus with a Dimroth condenser, a stirrer with a stirring blade and a stirring seal each made of Teflon®, and a temperature sensor with a glass protective tube. The Dean Stark apparatus was filled with cyclohexane, and the reaction system was heated to reflux under stirring. The temperature of the heating oil bath was 120° C.±5° C. The reaction system was heated to reflux for 44.5 hours while cyclohexane was added whenever necessary so as to keep the inner temperature at 110° C.±5° C., and then the reaction was terminated.

The LC-analysis results after the reaction found that the consumption rate of TMP-225 was 99.6%, and the average number of introduced SH per molecule of TMP-225 was 2.79.

(2) Desolvation

After the reaction, the solution was left standing to cool down to 60° C. under stirring so as not to be solidified. Then, an aqueous solution prepared by adding water (247.88 g) to a 30% NaOH aqueous solution (3.45 g) was promptly charged into the reaction vessel. The reaction system was gradually heated to about 100° C., and thereby cyclohexane was distilled off. Then, the heating was stopped, and nitrogen was bubbled into the solution at 30 mL/min for 90 minutes while the reaction system was left standing to cool so as to distill off the residual cyclohexane. Thereby, an aqueous solution of a target compound (PAG thiol compound (1)) was obtained.

The LC-analysis results of the obtained target compound found that the consumption rate of TMP-225 was 99.1%, and the average number of introduced SH per molecule of the TMP-225 was 2.73. The GPC-analysis results found that the monomer content was 78.0% and the rest was composed of the multimer.

Examples M-2 to M-6

Aqueous solutions of target compounds (PAG thiol compounds (2) to (6)) were obtained in the same manner as in Example M-1 except that the starting compounds, the reaction conditions, and the like in Example M-1 were changed as shown in Tables 1 and 2. Table 2 shows the LC-analysis results and GPC-analysis results after the esterification and the desolvation.

TABLE 1

| | Polyalkylene glycol chain-containing thiol compound | Adduct | Thiol compound | Esterification Amount(g) | | | | | Neutralization Amount(g) | |
| --- | --- | --- | --- | --- | --- | --- | --- | --- | --- | --- |
| | | | | Adduct | Thiol compound | PTS•1H$_2$O | PTZ | Cyclo-hexane | 30% NaOH | Water |
| Example M-1 | PAG thiol compound (1) | TMP-225 | 3-MPA | 250 | 8.72 | 5.17 | 0.0517 | 12.94 | 3.45 | 247.88 |
| Example M-2 | PAG thiol compound (2) | TMP-465 | 3-MPA | 250 | 5.97 | 5.12 | 0.1280 | 12.80 | 3.41 | 245.90 |
| Example M-3 | PAG thiol compound (3) | SB-300 | 3-MPA | 250 | 9.95 | 5.20 | 0.1300 | 13.00 | 3.46 | 251.17 |
| Example M-4 | PAG thiol compound (4) | TMP-330 | 3-MPA | 250 | 5.97 | 5.12 | 0.1280 | 12.80 | 3.41 | 245.90 |
| Example M-5 | PAG thiol compound (5) | SB-300 | 3-MPA | 250 | 5.97 | 5.12 | 0.1280 | 12.80 | 3.41 | 251.31 |
| Example M-6 | PAG thiol compound (6) | SB-60 | 3-MPA | 200 | 22.57 | 4.45 | 0.0445 | 11.13 | 2.96 | 229.99 |

TABLE 2

| | Polyalkylene glycol chain-containing thiol compound | Reaction temperature/° C. | Reaction time/h | Analysis value after esterification | | | Analysis value after desolvation | | | |
| --- | --- | --- | --- | --- | --- | --- | --- | --- | --- | --- |
| | | | | Consumption rate of adduct | Average number of introduced SH | GPC purity content | Consumption rate of adduct | Average number of introduced SH | GPC purity content | pH |
| Example M-1 | PAG thiol compound (1) | 110 | 44.5 | 99.6% | 2.79 | 78.0% | 99.1% | 2.73 | 74.8% | — |
| Example M-2 | PAG thiol compound (2) | 110 | 41.5 | 94.7% | 2.34 | 51.8% | 90.2% | 2.23 | 53.7% | — |
| Example M-3 | PAG thiol compound (3) | 110 | 43.5 | 99.0% | 4.39 | 75.0% | 98.0% | 3.99 | 65.4% | 6.50 |
| Example M-4 | PAG thiol compound (4) | 110 | 42.5 | 98.1% | 2.54 | 71.8% | 97.0% | 2.37 | 70.0% | 6.23 |
| Example M-5 | PAG thiol compound (5) | 110 | 28.5 | 100.0% | 2.11 | 74.3% | 96.0% | 2.50 | 65.7% | 6.52 |
| Example M-6 | PAG thiol compound (6) | 110 | 7.5 | 97.5% | 3.11 | 74.3% | 96.0% | 2.65 | — | — |

<Polyalkylene Glycol Chain-Containing Thiol Polymer>

Example P-1

BPT-91

Ion-exchange water was added to sodium methacrylate (SMAA, 0.92 g), methacrylic acid (MAA, 6.57 g), methoxy-polyethylene glycol methacrylate (average number of moles of ethylene oxide added: 25, PGM25E, 51.95 g), the PAG thiol compound (1) obtained in Example M-1 (3.06 g), and sodium hydroxide (NaOH, 0.30 g) to prepare a monomer solution in an amount in total of 100 g.

Ion-exchange water was added to 2,2'-azobis(2-methyl-propionamidine)dihydrochloride (Wako Pure Chemical Industries, Ltd., V-50, 0.069 g) to prepare an initiator solution in an amount in total of 50 g.

Ion-exchange water (100 g) was charged into a glass reaction vessel equipped with a Dimroth condenser, a stirrer with a stirring blade and a stirring seal each made of Teflon®, a nitrogen inlet tube, and a temperature sensor. The ion-exchange water was heated to 80° C. under stirring at 250 rpm while nitrogen was introduced thereinto at 200 mL/min.

Successively, the monomer solution and the initiator solution each mentioned above were dropwise added to the vessel over four hours and five hours, respectively. After the dropwise addition, the reaction solution was kept at 80° C. for 1 hour to complete the polymerization reaction. After cooling to room temperature, the pH of the reaction solution was adjusted to 6.0 with 30% NaOH aqueous solution. Thereby, an aqueous solution of the target polymer was obtained.

The GPC-analysis results found that the polymer had a Mw of 113,751, a Mp of 126,140, and a Mn of 55,041. Further, the polymer purity content was 96.8%.

Examples P-2 to P-24

BPT-92 to BPT-115

Aqueous solutions of the target polymers were obtained in the same manner as in Example P-1 except that the kinds of the monomer solution and the initiator solution, the amounts thereof, and the like in Example P-1 were changed as shown in Tables 3 and 4. Table 4 shows the GPC-analysis results.

TABLE 3

| | | Vessel charge | Monomer solution | | | | | | Initiator solution | |
| | | Water | PAG thiol compound | | SMAA | MAA | PGM25E | Water | NaOH | V-50 | Water |
| | BPT-No. | /g | Kind | /g | /g | /g | /g | /g | /g | /g | /g |
|---|---|---|---|---|---|---|---|---|---|---|---|
| Example P-1 | 91 | 100.00 | PAG thiol compound (1) | 3.06 | 0.92 | 6.57 | 51.95 | 37.20 | 0.30 | 0.069 | 49.93 |
| Example P-2 | 92 | 100.00 | PAG thiol compound (1) | 5.83 | 0.87 | 6.27 | 49.53 | 37.21 | 0.29 | 0.066 | 49.93 |
| Example P-3 | 93 | 100.00 | PAG thiol compound (1) | 8.35 | 0.84 | 5.99 | 47.33 | 37.22 | 0.28 | 0.063 | 49.94 |
| Example P-4 | 94 | 100.00 | PAG thiol compound (1) | 3.07 | 1.07 | 7.70 | 50.65 | 37.14 | 0.36 | 0.077 | 49.92 |
| Example P-5 | 95 | 100.00 | PAG thiol compound (1) | 5.85 | 1.02 | 7.34 | 48.28 | 37.16 | 0.34 | 0.073 | 49.93 |
| Example P-6 | 96 | 100.00 | PAG thiol compound (1) | 8.39 | 0.98 | 7.01 | 46.12 | 37.17 | 0.33 | 0.070 | 49.93 |
| Example P-7 | 97 | 100.00 | PAG thiol compound (4) | 5.83 | 0.87 | 6.27 | 49.53 | 37.21 | 0.29 | 0.066 | 49.93 |
| Example P-8 | 98 | 100.00 | PAG thiol compound (4) | 8.35 | 0.84 | 5.99 | 47.33 | 37.22 | 0.28 | 0.063 | 49.94 |
| Example P-9 | 99 | 100.00 | PAG thiol compound (4) | 10.66 | 0.80 | 5.73 | 45.31 | 37.23 | 0.27 | 0.061 | 49.94 |
| Example P-10 | 100 | 100.00 | PAG thiol compound (4) | 5.85 | 1.02 | 7.34 | 48.28 | 37.16 | 0.34 | 0.073 | 49.93 |
| Example P-11 | 101 | 100.00 | PAG thiol compound (4) | 8.39 | 0.98 | 7.01 | 46.12 | 37.17 | 0.33 | 0.070 | 49.93 |
| Example P-12 | 102 | 100.00 | PAG thiol compound (4) | 10.70 | 0.94 | 6.71 | 44.15 | 37.19 | 0.31 | 0.067 | 49.93 |
| Example P-13 | 109 | 100.00 | PAG thiol compound (5) | 5.83 | 0.87 | 6.27 | 49.53 | 37.21 | 0.29 | 0.066 | 49.93 |
| Example P-14 | 110 | 100.00 | PAG thiol compound (5) | 10.66 | 0.80 | 5.73 | 45.31 | 37.23 | 0.27 | 0.061 | 49.94 |
| Example P-15 | 111 | 100.00 | PAG thiol compound (5) | 14.73 | 0.74 | 5.28 | 41.75 | 37.26 | 0.24 | 0.056 | 49.94 |
| Example P-16 | 112 | 100.00 | PAG thiol compound (5) | 5.85 | 1.02 | 7.34 | 48.28 | 37.16 | 0.34 | 0.073 | 49.93 |
| Example P-17 | 115 | 100.00 | PAG thiol compound (5) | 10.70 | 0.94 | 6.71 | 44.15 | 37.19 | 0.31 | 0.067 | 49.93 |
| Example P-18 | 114 | 100.00 | PAG thiol compound (5) | 14.79 | 0.86 | 6.18 | 40.67 | 37.21 | 0.29 | 0.062 | 49.94 |
| Example P-19 | 103 | 100.00 | PAG thiol compound (3) | 5.83 | 0.87 | 6.27 | 49.53 | 37.21 | 0.29 | 0.066 | 49.93 |
| Example P-20 | 104 | 100.00 | PAG thiol compound (3) | 10.66 | 0.80 | 5.73 | 45.31 | 37.23 | 0.27 | 0.061 | 49.94 |
| Example P-21 | 105 | 100.00 | PAG thiol compound (3) | 14.73 | 0.74 | 5.28 | 41.75 | 37.26 | 0.24 | 0.056 | 49.94 |
| Example P-22 | 106 | 100.00 | PAG thiol compound (3) | 5.85 | 1.02 | 7.34 | 48.28 | 37.16 | 0.34 | 0.073 | 49.93 |
| Example P-23 | 107 | 100.00 | PAG thiol compound (3) | 10.70 | 0.94 | 6.71 | 44.15 | 37.19 | 0.31 | 0.067 | 49.93 |
| Example P-24 | 108 | 100.00 | PAG thiol compound (3) | 14.79 | 0.86 | 6.18 | 40.67 | 37.21 | 0.29 | 0.062 | 49.94 |

TABLE 4

| | | PAG thiol compound | | | Composition (part) | | | GPC analysis results | | | |
| | BPT-No. | Kind | The number of branches | EOmol | SMAA | PGM-25E | PAG thiol compound | Mw | Mp | Mn | Purity content |
|---|---|---|---|---|---|---|---|---|---|---|---|
| Example P-1 | 91 | PAG thiol compound (1) | 3 | 225 | 15 | 85 | 5 | 113751 | 126140 | 55041 | 96.8% |
| Example P-2 | 92 | PAG thiol compound (1) | 3 | 225 | 15 | 85 | 10 | 78822 | 84161 | 40079 | 96.4% |
| Example P-3 | 93 | PAG thiol compound (1) | 3 | 225 | 15 | 85 | 15 | 59704 | 63302 | 32098 | 96.3% |
| Example P-4 | 94 | PAG thiol compound (1) | 3 | 225 | 17.5 | 82.5 | 5 | 115623 | 127909 | 54802 | 97.2% |
| Example P-5 | 95 | PAG thiol compound (1) | 3 | 225 | 17.5 | 82.5 | 10 | 79862 | 85617 | 40128 | 97.1% |
| Example P-6 | 96 | PAG thiol compound (1) | 3 | 225 | 17.5 | 82.5 | 15 | 62076 | 64647 | 32680 | 97.1% |
| Example P-7 | 97 | PAG thiol compound (4) | 3 | 330 | 15 | 85 | 10 | 99298 | 109602 | 47383 | 96.4% |
| Example P-8 | 98 | PAG thiol compound (4) | 3 | 330 | 15 | 85 | 15 | 81312 | 88905 | 39406 | 96.1% |

TABLE 4-continued

| | | PAG thiol compound | | | Composition (part) | | | GPC analysis results | | | |
|---|---|---|---|---|---|---|---|---|---|---|---|
| | BPT-No. | Kind | The number of branches | EOmol | SMAA | PGM-25E | PAG thiol compound | Mw | Mp | Mn | Purity content |
| Example P-9 | 99 | PAG thiol compound (4) | 3 | 330 | 15 | 85 | 20 | 71683 | 76570 | 36783 | 96.2% |
| Example P-10 | 100 | PAG thiol compound (4) | 3 | 330 | 17.5 | 82.5 | 10 | 101842 | 113504 | 47683 | 96.4% |
| Example P-11 | 101 | PAG thiol compound (4) | 3 | 330 | 17.5 | 82.5 | 15 | 80352 | 89055 | 39145 | 96.2% |
| Example P-12 | 102 | PAG thiol compound (4) | 3 | 330 | 17.5 | 82.5 | 20 | 68922 | 75204 | 34219 | 96.2% |
| Example P-13 | 109 | PAG thiol compound (5) | 3 | 300 | 15 | 85 | 10 | 103532 | 116676 | 45728 | 95.0% |
| Example P-14 | 110 | PAG thiol compound (5) | 3 | 300 | 15 | 85 | 20 | 70303 | 78088 | 30241 | 94.8% |
| Example P-15 | 111 | PAG thiol compound (5) | 3 | 300 | 15 | 85 | 30 | 54862 | 61868 | 24321 | 94.7% |
| Example P-16 | 112 | PAG thiol compound (5) | 3 | 300 | 17.5 | 82.5 | 10 | 98551 | 113017 | 42845 | 96.1% |
| Example P-17 | 115 | PAG thiol compound (5) | 3 | 300 | 17.5 | 82.5 | 20 | 69425 | 79996 | 28410 | 94.8% |
| Example P-18 | 114 | PAG thiol compound (5) | 3 | 300 | 17.5 | 82.5 | 30 | 56851 | 62260 | 28132 | 94.6% |
| Example P-19 | 103 | PAG thiol compound (3) | 5 | 300 | 15 | 85 | 10 | 97880 | 109552 | 45533 | 95.4% |
| Example P-20 | 104 | PAG thiol compound (3) | 5 | 300 | 15 | 85 | 20 | 82876 | 74515 | 38178 | 95.8% |
| Example P-21 | 105 | PAG thiol compound (3) | 5 | 300 | 15 | 85 | 30 | 51677 | 48975 | 27131 | 94.3% |
| Example P-22 | 106 | PAG thiol compound (3) | 5 | 300 | 17.5 | 82.5 | 10 | 96827 | 104487 | 46011 | 95.3% |
| Example P-23 | 107 | PAG thiol compound (3) | 5 | 300 | 17.5 | 82.5 | 20 | 67012 | 67063 | 31639 | 95.4% |
| Example P-24 | 108 | PAG thiol compound (3) | 5 | 300 | 17.5 | 82.5 | 30 | 52847 | 49347 | 25690 | 95.6% |

Example P-25

IB-110

Acrylic acid (AA, 9.33 g), the PAG thiol compound (1) obtained in Example M-1 (6.09 g), and ion-exchange water (31.05 g) were mixed to prepare a monomer solution.

Ion-exchange water was added to 2,2'-azobis(2-methyl-propionamidine)dihydrochloride (Wako Pure Chemical Industries, Ltd., V-50, 0.0962 g) to prepare an initiator solution in an amount in total of 37.5 g.

A 3-methyl-3-buten-1-ol ethylene oxide adduct (average number of moles of ethylene oxide added: 50 mols, IPN-50, 109.58 g), and ion-exchange water (56.45 g) were charged into a glass reaction vessel equipped with a Dimroth condenser, a stirrer with a stirring blade and a stirring seal each made of Teflon®, a nitrogen inlet tube, and a temperature sensor. Then, the mixture was heated to 80° C. under stirring at 300 rpm while nitrogen was introduced thereinto at 200 mL/min. Successively, the monomer solution and the initiator solution each mentioned above were dropwise added to the reaction vessel over 3 hours and 3.5 hours, respectively. After the dropwise addition, the reaction solution was kept at 80° C. for 1 hour to complete the polymerization reaction. After cooling to room temperature, the pH of the reaction solution was adjusted to 6.0 with a 30% NaOH aqueous solution. Thereby, an aqueous solution of the target polymer was obtained.

The GPC-analysis results found that the polymer had a Mw of 53,597, a Mp of 60,508, and a Mn of 25,696. Further, the polymer purity content was 86.4%.

Examples P-26 to P-36

IB-111 to IB-126

Aqueous solutions of the target polymers were obtained in the same manner as in Example P-25 except that the kinds of the monomer solution and the initiator solution, the amounts thereof, and the like in Example P-25 were changed as shown in Tables 5 and 6. Table 6 shows the GPC-analysis results.

TABLE 5

| | | Vessel charge | | Monomer solution | | | | Initiator solution | |
|---|---|---|---|---|---|---|---|---|---|
| | | IPN-50 | Water | PAG thiol compound | | AA | Water | V-50 | Water |
| | IB-No. | /g | /g | Kind | /g | /g | /g | /g | /g |
| Example P-25 | 110 | 109.58 | 56.45 | PAG thiol compound (1) | 6.09 | 9.33 | 31.05 | 0.0962 | 37.4 |
| Example P-26 | 111 | 104.49 | 53.83 | PAG thiol compound (1) | 11.61 | 8.90 | 33.67 | 0.0917 | 37.41 |
| Example P-27 | 112 | 99.86 | 51.44 | PAG thiol compound (1) | 16.64 | 8.50 | 36.06 | 0.0877 | 37.41 |
| Example P-28 | 113 | 107.15 | 55.20 | PAG thiol compound (1) | 6.12 | 11.73 | 32.30 | 0.1137 | 37.39 |
| Example P-29 | 114 | 102.15 | 52.62 | PAG thiol compound (1) | 11.67 | 11.18 | 34.88 | 0.1084 | 37.39 |
| Example P-30 | 115 | 97.59 | 50.27 | PAG thiol compound (1) | 16.73 | 10.68 | 37.23 | 0.1035 | 37.4 |
| Example P-31 | 119 | 109.58 | 56.45 | PAG thiol compound (4) | 6.09 | 9.33 | 31.05 | 0.0962 | 37.4 |
| Example P-32 | 120 | 104.49 | 53.83 | PAG thiol compound (4) | 11.61 | 8.90 | 33.67 | 0.0917 | 37.41 |
| Example P-33 | 121 | 99.86 | 51.44 | PAG thiol compound (4) | 16.64 | 8.50 | 36.06 | 0.0877 | 37.41 |
| Example P-34 | 122 | 107.15 | 55.20 | PAG thiol compound (4) | 6.12 | 11.73 | 32.30 | 0.1137 | 37.39 |
| Example P-35 | 125 | 102.15 | 52.62 | PAG thiol compound (4) | 11.67 | 11.18 | 34.88 | 0.1084 | 37.39 |
| Example P-36 | 126 | 97.59 | 50.27 | PAG thiol compound (4) | 16.73 | 10.68 | 37.23 | 0.1035 | 37.4 |

TABLE 6

|  | IB-No. | PAG thiol compound Kind | The number of branches | EOmol | SAA | IPN-50 | PAG thiol compound | Mw | Mp | Mn | Purity content |
|---|---|---|---|---|---|---|---|---|---|---|---|
| Example P-25 | 110 | PAG thiol compound (1) | 3 | 225 | 10 | 90 | 5 | 53597 | 60508 | 25696 | 86.4% |
| Example P-26 | 111 | PAG thiol compound (1) | 3 | 225 | 10 | 90 | 10 | 41480 | 43025 | 22286 | 83.1% |
| Example P-27 | 112 | PAG thiol compound (1) | 3 | 225 | 10 | 90 | 15 | 36836 | 36344 | 20620 | 83.7% |
| Example P-28 | 113 | PAG thiol compound (1) | 3 | 225 | 12.5 | 87.5 | 5 | 62977 | 69288 | 27249 | 89.8% |
| Example P-29 | 114 | PAG thiol compound (1) | 3 | 225 | 12.5 | 87.5 | 10 | 48260 | 50257 | 23647 | 88.8% |
| Example P-30 | 115 | PAG thiol compound (1) | 3 | 225 | 12.5 | 87.5 | 15 | 41165 | 40583 | 21613 | 88.2% |
| Example P-31 | 119 | PAG thiol compound (4) | 3 | 330 | 10 | 90 | 5 | 56190 | 65483 | 25360 | 85.8% |
| Example P-32 | 120 | PAG thiol compound (4) | 3 | 330 | 10 | 90 | 10 | 50868 | 55249 | 24206 | 85.3% |
| Example P-33 | 121 | PAG thiol compound (4) | 3 | 330 | 10 | 90 | 15 | 43511 | 45436 | 21641 | 86.1% |
| Example P-34 | 122 | PAG thiol compound (4) | 3 | 330 | 12.5 | 87.5 | 5 | 68799 | 78422 | 27702 | 88.6% |
| Example P-35 | 125 | PAG thiol compound (4) | 3 | 330 | 12.5 | 87.5 | 10 | 55296 | 63354 | 23978 | 89.1% |
| Example P-36 | 126 | PAG thiol compound (4) | 3 | 330 | 12.5 | 87.5 | 15 | 50483 | 52638 | 23411 | 88.7% |

In Tables 3 to 6, the composition of each polymer is expressed as a mass ratio on complete NaOH neutralization basis (in the case that carboxylic acids are completely neutralized with NaOH), and the sum of the constitutional ratios is not 100% because the PAG thiol compound is considered in terms of outer percentage.

Comparative Example 1

F-1

Sodium methacrylate (SMAA, 0.93 g), methacrylic acid (MAA, 73.29 g), methoxypolyethylene glycol methacrylate (average number of moles of ethylene oxide added: 25, PGM25E, 371.72 g), 3-mercaptopropionic acid (MPA, 4.06 g), and ion-exchange water (112.5 g) were mixed to prepare a monomer solution.

Ammonium persulfate (APS, Wako Pure Chemical Industries, Ltd., 5.13 g) and ion-exchange water (82.37 g) were mixed to prepare an initiator solution.

Ion-exchange water (350.00 g) was charged into a glass reaction vessel equipped with a Dimroth condenser, a stirrer with a stirring blade and a stirring seal each made of Teflon®, a nitrogen inlet tube, and a temperature sensor. Then, the ion-exchange water was heated to 80° C. under stirring at 200 rpm while nitrogen was introduced thereinto at 200 mL/min. Successively, the monomer solution and the initiator solution each mentioned above were dropwise added to the reaction vessel over 4 hours and 5 hours, respectively. After the dropwise addition, the reaction solution was kept at 80° C. for 1 hour to complete the polymerization reaction. After cooling to room temperature, the pH of the reaction solution was adjusted to 7.0 with a 30% NaOH aqueous solution. Thereby, an aqueous solution of a comparison polymer was obtained.

The GPC-analysis results found that the polymer had a Mw of 24,200, a Mp of 18,600, and a Mn of 12,600. Further, the polymer purity content was 95.3%.

TABLE 7

|  | No. | Vessel charge Water /g | Monomer solution SMAA /g | MAA /g | PGM25E /g | MPA /g | Water /g | Initiator solution V-50 /g | Water /g |
|---|---|---|---|---|---|---|---|---|---|
| Comparative Example 1 | F-1 | 350.00 | 0.93 | 73.29 | 371.72 | 4.06 | 112.50 | 5.13 | 82.37 |

TABLE 8

|  | No. | Composition (part) SMAA | IPN-50 | GPC analysis results Mw | Mp | Mn | Purity content |
|---|---|---|---|---|---|---|---|
| Comparative Example 1 | F-1 | 20 | 80 | 24200 | 18600 | 12600 | 95.3% |

Comparative Example 2

L-2

Acrylic acid (AA, Nippon Shokubai Co., Ltd.) and ion-exchange water were mixed to prepare a monomer solution; 30% hydrogen peroxide (H₂O₂, Wako Pure Chemical Industries, Ltd.) and ion-exchange water were mixed to prepare a vessel-charge initiator aqueous solution; and L-ascorbic acid (L-AS, product of Wako Pure Chemical Industries, Ltd.), 3-mercaptopropionic acid (MPA), and ion-exchange water were mixed to prepare a transfer agent, each in accordance with the amounts shown in Table 9.

A 3-methyl-3-buten-1-ol ethylene oxide adduct (average number of moles of ethylene oxide added: 50 mol, IPN-50), acrylic acid (AA, Nippon Shokubai Co., Ltd.), and ion-exchange water in amounts shown in Table 9 were charged into a glass reaction vessel equipped with a Dimroth condenser, a stirrer with a stirring blade and a stirring seal each made of Teflon®, a nitrogen inlet tube, and a temperature sensor. Then, the mixture was heated to 58° C. under stirring at 200 rpm while nitrogen was introduced thereinto at 200 mL/min. Next, the whole vessel-charge initiator aqueous solution was charged and heated to 58° C. Successively, the monomer solution and the transfer agent solution each mentioned above were dropwise added to the vessel over 3 hours and 3.5 hours, respectively. After the dropwise addition, the reaction solution was kept at 58° C. for 1 hour to complete the polymerization reaction. After cooling to room temperature, the pH of the reaction solution was adjusted to 6.0 with a 30% NaOH aqueous solution. Thereby, an aqueous solution of a comparison polymer was obtained.

Table 9 shows the amounts of the respective compounds and the like. Table 10 shows the GPC analysis results of the obtained comparison polymer aqueous solution.

11 and 12 was weighed out. An antifoaming agent MA-404 (Pozzolith Bussan Co., Ltd.) in 10% by mass on an as-is basis relative to the polymer solids content and ion-exchange water were added thereto to be a sufficiently homogeneous solution in a predetermined amount. The polymer amounts in Tables 11 and 12 each are expressed in % by mass of the polymer solids content relative to the cement mass.

A stainless steel beater (stirring blade) was attached to a Hobart-type mortar mixer (model number N-50, Hobart Corp.), and the components C and W were charged thereinto. The components were kneaded for 30 seconds at the first speed, and the component S was added thereto over 30 seconds under kneading at the first speed. After the whole component S was added, the mixture was kneaded for 30 seconds at the second speed, and the mixer was stopped. Then, the mortar was scraped off for 15 seconds, followed by still standing for 75 minutes. Thereafter, the mixture was further kneaded for 60 seconds at the second speed to provide mortar.

The mortar was transferred from the kneading container to a 1-L polyethylene container, and stirred 20 times with a spatula. Immediately after that, the mortar was charged into a flow corn (JIS R5201-1997) placed on a flow table (JIS R5201-1997) so as to fill the corn one-half full, and then jabbed with a stick 15 times. Then, the mortar was further charged into the corn so as to completely fill the corn, and then jabbed with a stick 15 times. Finally, the flow corn was refilled

TABLE 9

| | | Vessel charge | | | Monomer solution | | Tranasfer agent solution | | | Vessel-charge initiator | |
|---|---|---|---|---|---|---|---|---|---|---|---|
| | No. | IPN-50 /g | AA /g | Water /g | AA /g | Water /g | L-AS /g | MPA /g | Water /g | 30% $H_2O_2$ /g | Water /g |
| Comparative Example 2 | L-2 | 517.83 | 0.94 | 267.24 | 31.24 | 32.76 | 0.59 | 1.18 | 98.23 | 1.525 | 48.47 |

TABLE 10

| | | Composition (part) | | GPC analysis result | | | |
|---|---|---|---|---|---|---|---|
| | No. | SAA | IPN-50 | Mw | Mp | Mn | purity |
| Comparative Example 2 | L-2 | 7.5 | 92.5 | 33157 | 33600 | 17598 | 76.6% |

In Tables 7 to 10, the composition of each polymer is expressed as a mass ratio on complete NaOH neutralization basis (in the case that carboxylic acids are completely neutralized with NaOH).

Evaluation Procedures for Cement Dispersibility:
Mortar Test

Test Examples 1 to 14

The mortar test was carried out at a temperature of 20° C.±1° C. and at a relative humidity of 60%±10%. The mortar composition was C/S/W=550/1350/220 (g), wherein
C: Ordinary Portland cement (Taiheiyo Cement Corp.),
S: Standard sand for cement strength test (Japan Cement Association), and
W: Ion-exchange water solution of the polymer of the present invention or the comparison polymer and an antifoaming agent.
The component W was prepared in the following manner. The polymer aqueous solution in an amount shown in Tables with the mortar, and the surface thereof was leveled. Immediately thereafter, the flow corn was lifted vertically. The spread mortar was measured for diameters at two points (the longest diameter (major axis) and the diameter that forms an angle of 90° with the major axis). The average of the two diameters was determined as the 0-hit flow value. Immediately after the 0-hit flow value was measured, the flow table was moved up and down 15 times for 15 seconds, and then the spread mortar was measured for diameters at two points (the longest diameter (major axis) and the diameter that forms an angle of 90° with the major axis). The average of the two diameters was determined as 15-hit flow value. The mortar air content was also measured if needed.

The higher the 0-hit and 15-hit flow values are, the higher the dispersibility is.

<Determination of Mortar Air Content>

The mortar (about 200 mL) was charged into a 500-mL glass graduated cylinder, jabbed with an 8-mm-diameter round bar, and lightly shaken with a hand to remove coarse bubbles. The mortar (about 200 mL) was further added and bubbles were similarly removed. Then, the volume and mass of the mortar were measured, and the air content was calculated from densities of the respective materials.

TABLE 11

| | Example/ Comparative Example | Used polymer | Amount % by mass relative to C | 15-hit flow value (mm) |
|---|---|---|---|---|
| Test Example 1 | Example | BPT-91 | 0.065 | 203 |
| Test Example 2 | Example | BPT-92 | 0.065 | 206 |
| Test Example 3 | Example | BPT-93 | 0.065 | 200 |
| Test Example 4 | Example | BPT-95 | 0.065 | 202 |
| Test Example 5 | Example | BPT-96 | 0.065 | 207 |
| Test Example 6 | Comparative Example | F-1 | 0.065 | 189 |
| Test Example 7 | Comparative Example | F-1 | 0.080 | 210 |

In Table 11, "Example" means that the test example corresponds to an example, and "Comparative Example" means that the test example corresponds to a comparative example.

The results in Table 11 indicate the following respects.

According to the mortar test results, the polyalkylene glycol chain-containing thiol polymers of Test Examples 1 to 5 each achieved a 15-hit flow value that is larger than the polymer of Test Example 6 (comparative example) by 10 mm or larger in the same amount.

From the result of Test Example 7 where the amount of the polymer is larger than that of Test Example 6 (comparative example), the polymer of Test Example 6 would be presumably required to be used in an amount of about 0.0725% for achieving a 15-hit flow value of 200 mm. In contrast, the polyalkylene glycol chain-containing thiol polymers each achieved a 15-hit flow value of 200 mm or larger in an amount of 0.065%. That is, these polymers each achieve a flow value equivalent to that of the polymer of Test Example 6 even in an amount at least 10% less than the polymer of Test Example 6 (0.065/0.0725=90%), and have very high cement dispersibility.

TABLE 12

| | Example/ Comparative Example | Polymer used | Amount % by mass relative to C | 15-hit flow value (mm) |
|---|---|---|---|---|
| Test Example 8 | Example | IB-110 | 0.08 | 223 |
| Test Example 9 | Example | IB-111 | 0.08 | 205 |
| Test Example 10 | Example | IB-113 | 0.08 | 213 |
| Test Example 11 | Example | IB-114 | 0.08 | 212 |
| Test Example 12 | Example | IB-115 | 0.08 | 205 |
| Test Example 13 | Comparative Example | L-2 | 0.08 | 196 |
| Test Example 14 | Comparative Example | L-2 | 0.09 | 218 |

In Table 12, "Example" means that the test example corresponds to an example, and "Comparative Example" means that the test example corresponds to a comparative example.

The results in Table 12 indicate the following respects.

According to the mortar test results, the polyalkylene glycol chain-containing thiol polymers of Test Examples 8 to 12 each achieved a 15-hit flow value that is larger than that of the polymer of Test Example 13 (comparative example) by 9 mm or larger in the same amount.

From the result of Test Example 14 where the amount of the polymer is larger than that of Test Example 13 (comparative example), the polymer of Test Example 13 would be presumably required to be used in an amount of about 0.084% for achieving a 15-hit flow value of 205 mm. The polyalkylene glycol chain-containing thiol polymers each achieved a 15-hit flow value of 205 mm or larger even in an amount of 0.08%. That is, these polymers each achieve a flow value equivalent to that of the polymer of Test Example 13 even in an amount at least 5% less than the polymer of Test Example 13 (0.08/0.084=95%), and have very high cement dispersibility.

<Polyalkylene Glycol Chain-Containing Thiol Compound (PAG Thiol Compound)>

Example M-7

(1) Dehydration Esterification

A sorbitol ethylene oxide 300 mol adduct (SB-300), 3-mercaptopropionic acid (3-MPA), p-toluenesulfonic acid monohydrate (PTS.1H$_2$O), phenothiazine (PTZ), and cyclohexane in amounts shown in Table 13-1 were charged into a glass reaction vessel equipped with a Dean Stark apparatus with a Dimroth condenser, a stirrer with a stirring blade and a stirring seal each made of Teflon®, and a temperature sensor with a glass protective tube. The Dean Stark apparatus was filled with cyclohexane, and the reaction system was heated to reflux under stirring. The temperature of the heating oil bath was 120° C.±5° C. The reaction system was heated to reflux for 44.5 hours while cyclohexane was added whenever necessary so as to control the inner temperature at 110° C.±5° C., and then the reaction was terminated.

Table 13-2 shows the LC analysis results after the ester reaction.

(2) Desolvation

After the reaction, the solution was left standing to cool to 60° C. under stirring so as not to be solidified. Then, an aqueous solution prepared by adding water to a 30% NaOH aqueous solution in amounts shown in Table 13-1 was promptly charged into the reaction vessel. The reaction system was gradually heated to about 100° C., and thereby cyclohexane was distilled off. Then, the heating was stopped, and nitrogen was bubbled into the solution at 30 mL/min for 90 minutes while the reaction system was left standing to cool so as to distill off the residual cyclohexane. Thereby, an aqueous solution of the target compound (PAG thiol compound (7)) was obtained.

Table 13-2 shows the LC analysis results and the GPC analysis results of the obtained target compound.

Examples M-8 and M-9

Aqueous solutions of the target compounds (PAG thiol compounds (8) and (9)) were obtained in the same manner as in Example M-7 except that the starting compounds, the reaction conditions, and the like in Example M-7 were changed as shown in Tables 13-1 and 13-2. Table 13-2 shows the LC analysis results and the GPC analysis results after the esterification and the desolvation. In Table 13-1, MiBA means mercapto isobutyric acid.

The PAG thiol compound (8) obtained in Example M-8 corresponds to a polyalkylene glycol chain-containing thiol compound having the above structure (II-2), specifically in which the group having a carbonyl group has a carbonyl group and a tertiary or quaternary carbon atom bonding to the carbonyl group. The PAG thiol compound (9) obtained in Example M-9 corresponds to a polyalkylene glycol chain-containing thiol compound having the above structure (II-1), specifically in which at least one terminal unit of the polyalkylene glycol chain on the side of the group having a carbonyl group is an oxyalkylene group having three or more carbon atoms.

Ion-exchange water (100 g) was charged into a glass reaction vessel equipped with a Dimroth condenser, a stirrer with a stirring blade and a stirring seal each made of Teflon®, a nitrogen inlet tube, and a temperature sensor, and then heated to 80° C. under stirring at 250 rpm while nitrogen was introduced thereinto at 200 mL/min.

Successively, the monomer solution and the initiator solution each mentioned above were dropwise added to the vessel over 4 hours and 5 hours, respectively. After the dropwise

TABLE 13-1

| | | (Starting material) | | Esterification Amount(g) | | | | | Neutralization Amount (g) | |
|---|---|---|---|---|---|---|---|---|---|---|
| | | (Starting material) | thiol group-containing | | Thiol group-containing | | | | | |
| | Product | Adduct | compound | Adduct | compound | PTS•1H$_2$O | PTZ | Cyclohexane | 30% NaOH | Water |
| Example M-7 | PAG thiol compound (7) | SB-300 | 3-MPA | 250.00 | 9.95 | 5.20 | 0.1300 | 13.00 | 3.46 | 251.17 |
| Example M-8 | PAG thiol compound (8) | SB-300 | MiBA | 250.00 | 12.17 | 5.24 | 0.1311 | 13.11 | 3.49 | 252.68 |
| Example M-9 | PAG thiol compound (9) | SB-300 + 12BO | 3-MPA | 250.00 | 10.02 | 5.20 | 0.1300 | 13.00 | 3.46 | 250.50 |

TABLE 13-2

| | | | | Analysis value after esterifcation | | | Analysis value after desolvation | | | |
|---|---|---|---|---|---|---|---|---|---|---|
| | Product | Reaction temperature/° C. | Reaction time/h | Consumption rate of adduct | Average number of introduced SH | GPC purity content | Consumption rate of adduct | Average number of introduced SH | GPC purity content | pH |
| Example M-7 | PAG thiol compound (7) | 110 | 43.5 | 99.0% | 4.39 | 75.0% | 98.0% | 3.99 | 65.4% | 6.50 |
| Example M-8 | PAG thiol compound (8) | 110 | 70.0 | 99.5% | 4.42 | 84.5% | 99.2% | 4.15 | 81.8% | 6.50 |
| Example M-9 | PAG thiol compound (9) | 110 | 70.0 | 99.3% | 4.45 | 84.7% | 99.1% | 4.20 | 82.2% | 6.50 |

Polyalkylene Glycol Chain-Containing Thiol Polymer

Example P-37

BPT-107

Ion-exchange water was added to sodium methacrylate (SMAA), methacrylic acid (MAA), methoxypolyethylene glycol methacrylate (average number of moles of ethylene oxide added: 25, PGM25E), PAG thiol compound (7) obtained in Example M-7, and sodium hydroxide (NaOH) in amounts shown in Table 14-1 to prepare a monomer solution in an amount in total of 100 g.

Ion-exchange water was added to 2,2'-azobis(2-methylpropionamidine)dihydrochloride (Wako Pure Chemical Industries, Ltd., V-50) in an amount shown in Table 14-1 to prepare an initiator solution in an amount in total of 50 g.

addition, the solution was kept at 80° C. for 1 hour to complete the polymerization reaction. After cooling to room temperature, the pH of the reaction solution was adjusted to 6.0 with a 30% NaOH aqueous solution. Thereby, an aqueous solution of the target polymer was obtained. Table 14-2 shows the GPC analysis results.

Examples P-38 and P-39

BPT-127, BPT-128

Aqueous solutions of the target polymers were obtained in the same manner as in Example P-37 except that the kinds, amounts, and the like of the monomer solution and the initiator solution in Example P-37 were changed as shown in Tables 14-1 and 14-2. Table 14-2 shows the GPC analysis results.

TABLE 14-1

| Produced polymer BPT-No. | Monomer solution | | | | | | | Initiator solution | | Vessel charge |
|---|---|---|---|---|---|---|---|---|---|---|
| | PAG thiol compound | | SMAA | MAA | PGM25E | Water | NaOH | V-50 | Water | Water |
| | Kind | /g | /g | /g | /g | /g | /g | /g | /g | /g |
| Example P-37 | 107 | PAG thiol compound (7) | 10.70 | 0.94 | 6.71 | 44.15 | 37.19 | 0.31 | 0.067 | 49.93 | 100.00 |
| Example P-38 | 127 | PAG thiol compound (8) | 10.70 | 0.94 | 6.71 | 44.15 | 37.19 | 0.31 | 0.067 | 49.93 | 100.00 |
| Example P-39 | 128 | PAG thiol compound (9) | 10.70 | 0.94 | 6.71 | 44.15 | 37.19 | 0.31 | 0.067 | 49.93 | 100.00 |

TABLE 14-2

| Produced polymer BPT-No. | PAG thiol compound | | The number of branches | AOmol | Composition (part) | | | GPC analysis result | | | Purity content |
|---|---|---|---|---|---|---|---|---|---|---|---|
| | Kind | | | | SMAA | PGM-25E | PAG thiol compound | Mw | Mp | Mn | |
| Example P-37 | 107 | PAG thiol compound (7) | 5 | 300 | 17.5 | 82.5 | 20 | 67012 | 67063 | 31639 | 95.4% |
| Example P-38 | 127 | PAG thiol compound (8) | 5 | 300 | 17.5 | 82.5 | 20 | 67682 | 67734 | 31955 | 96.4% |
| Example P-39 | 128 | PAG thiol compound (9) | 5 | 312 | 17.5 | 82.5 | 20 | 70363 | 70416 | 33221 | 96.8% |

In Tables 14-1 and 14-2, the composition of each polymer is expressed as a mass ratio on complete NaOH neutralization basis (in the case that carboxylic acids are completely neutralized with NaOH), and the sum of the constitutional ratios is not 100% because the PAG thiol compound is considered in terms of outer percentage.

The polymers obtained in Examples P-37 to P-39 were evaluated for hydrolyzability (storage stability) as follows.

<Procedure of Hydrolyzability (60° C.) Test>

An aqueous solution of 45% by mass of the polymer BPT-107 obtained in Example P-37, an aqueous solution of 45% by mass of the polymer BPT-127 obtained in Example P-38, and an aqueous solution of 45% by mass of the polymer BPT-128 obtained in Example P-39 were prepared. The pH value of each polymer aqueous solution was set to 7. Each of these three polymer aqueous solutions was stored for 0 to 84 days at a solution temperature of 60° C., and the weight average molecular weight and polymer purity content thereof were measured over time. In addition, the decrease rate of the weight average molecular weight (Mw) relative to that just after the pH adjustment (0-day storage) was calculated. During the storage, the polymer aqueous solutions were kept at 60° C.

Table 15 shows the results. FIG. 1 is a graph in which the Mw decrease rates shown in Table 15 are compared according to the polymers.

TABLE 15

| Polymer No. | Day | Mw | Polymer purity content (%) | Mw decrease rate |
|---|---|---|---|---|
| BPT-107 | 0 | 66859 | 95.4 | 0.0% |
| (Example P-37) | 7 | 50743 | 95.1 | 31.8% |
| | 14 | 48018 | 94.5 | 39.2% |
| | 28 | 45973 | 94.4 | 45.4% |
| | 56 | 43615 | 93.6 | 53.3% |
| | 84 | 43335 | 93.8 | 54.3% |
| BPT-127 | 0 | 67503 | 96.4 | 0.0% |
| (Example P-38) | 7 | 65116 | 96.3 | 3.7% |
| | 14 | 63674 | 96.4 | 6.0% |
| | 28 | 61665 | 95.5 | 9.5% |
| | 56 | 58599 | 94.9 | 15.2% |
| | 84 | 54833 | 95.1 | 23.1% |

TABLE 15-continued

| Polymer No. | Day | Mw | Polymer purity content (%) | Mw decrease rate |
|---|---|---|---|---|
| BPT-128 | 0 | 70215 | 96.8 | 0.0% |
| (Example P-39) | 7 | 66988 | 96.5 | 4.8% |
| | 14 | 66590 | 96.5 | 5.4% |
| | 28 | 64956 | 95.9 | 8.1% |
| | 56 | 63325 | 94.9 | 10.9% |
| | 84 | 60362 | 95.0 | 16.3% | pH = 7

In the polymers having an ester bond, the molecular weight (e.g. Mw) decreases as hydrolysis of the ester bond portion proceeds. The following will specifically mention this phenomenon by taking the polymer represented by the above formula (1') as an example: an ester bond portion formed by a terminal oxygen atom of the polyalkylene glycol chain (1) represented by $(AO)_n$ and a carbonyl group in the group represented by Y is hydrolyzed, and thus the molecular weight (e.g. Mw) of the polymer decreases. Therefore, a smaller decrease rate of the weight average molecular weight (Mw) means a higher hydrolysis resistance.

In the comparison among the Mw decrease rates in Table 15 and FIG. 1 from this viewpoint, the polymers BPT-127 (P-38) and BPT-128 (P-39) each obtained from the polyalkylene glycol chain-containing thiol compound having the above specific structure (II-1) and/or (II-2) each show an Mw decrease rate much smaller than the polymer BPT-107 (P-37) having neither of the above specific structure (II-1) and (II-2) of the present invention. The difference is as great as about 30% or more, for example, after 84-day storage. This result shows that use of the polyalkylene glycol chain-containing thiol compound having the above specific structure (II-1) and/or (II-2) greatly improves hydrolysis resistance of the polymers, and thus the polymers more stably exhibit their performances for a long period of time.

Evaluation Procedure for Cement Dispersibility:
Mortar Test

Test Examples 15 to 19

The mortar test was carried out in the same manner as in Test Example 1. Table 16 shows the amounts of the polymers (solids content relative to cement mass, % by mass) and 15-hit flow values.

TABLE 16

|  | Example/ Comparative Example | Polymer used | Amount % by mass relative to C | 15-hit flow value/ mm |
|---|---|---|---|---|
| Test Example 15 | Example | BPT-107 | 0.065 | 200 |
| Test Example 16 | Example | BPT-127 | 0.065 | 199 |
| Test Example 17 | Example | BPT-128 | 0.065 | 201 |
| Test Example 18 | Comparative Example | F-1 | 0.065 | 189 |
| Test Example 19 | Comparative Example | F-1 | 0.0725 | 200 |

In Table 16, "Example" means that the test example corresponds to an example, and "Comparative Example" means that the test example corresponds to a comparative example. The larger the 15-hit flow value is, the higher the mortar dispersibility attributed to the polymer is.

The results in Table 16 indicate the following respects.

The polyalkylene glycol chain-containing thiol polymers of the present invention, used in Test Examples 16 and 17, each achieved a 15-hit flow value that is larger than the comparison polymer F-1 of Test Example 18 (comparison polymer F-1 obtained in the above Comparative Example 1) by 10 mm or larger in the same amount (0.065%). From the result of the test (Test Example 19) where the amount is larger than that of the comparison polymer F-1, the comparison polymer F-1 would be presumably required to be used in an amount of about 0.0725% so as to achieve a 15-hit flow value of 200 mm, which is equivalent to that in Test Examples 16 and 17. That is, the polymers of the present invention each achieve a flow value equivalent to that of the comparison polymer F-1 in an amount at least 10% less than the comparison polymer F-1 (0.065/0.0725=90%), and have very high cement dispersibility.

Only a small difference is found between Test Example 15 (polymer BPT-107) and Test Examples 16 and 17 (polymers BPT-127 and BPT-128). This is presumably because the polymer BPT-107 has a structure similar to the structure represented by formula (1) of the polymers BPT-127 and BPT-128 (although the polymer BPT-107 does not have the specific structure (II-1) or (II-2)), and also has a (poly)alkylene glycol chain (1) represented by (AO)$_n$ in the main chain. The comparison polymer F-1 is a usual polymer without such a (poly)alkylene glycol chain (1), i.e., a polymer corresponding to only the Z moiety in the above formula (1). As is clear from the above-mentioned hydrolysis test results, the polymer BPT-107 free of the above-mentioned specific structure (II-1) or (II-2) tends to be hydrolyzed over time, whereas the polymer with the above-mentioned specific structure (II-1) and/or (II-2) (the polymers BPT-127 and BPT-128) has significantly high hydrolysis resistance, and thus more stably exhibits high dispersibility for a long period of time. In this point, the polymer with the above-mentioned specific structure (II-1) and/or (II-2) shows much better effects.

The invention claimed is:

1. A multi-branched polymer, comprising:
   a polyalkylene glycol chain;
   a residue of a compound having three or more active hydrogen atoms; and
   a polymer portion having a constitutional unit derived from a vinyl monomer component,
   one end of the polyalkylene glycol chain bonding to the residue, and
   a terminal oxygen atom of at least one of the other ends of the polyalkylene glycol chain bonding to a main chain end of the polymer portion directly or via an organic residue, wherein said multi-branched polymer is represented by the following formula (1):

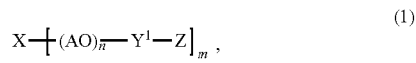

wherein X is a residue of the compound having three or more active hydrogen atoms; each AO is a C2-C18 oxyalkylene group, and the AOs may be the same as or different from each other; each $Y^1$ is a direct bond or an organic residue; each Z is a polymer portion having a constitutional unit derived from a vinyl monomer component; each n is the average number of moles of the oxyalkylene groups added and is 5 to 1,000, and the ns may be the same as or different from each other; and m is an integer of 3 to 50.

2. The multi-branched polyalkylene glycol polymer according to claim 1, wherein the vinyl monomer component contains an unsaturated carboxylic monomer.

3. The multi-branched polyalkylene glycol polymer according to claim 1, wherein the vinyl monomer component contains an unsaturated polyalkylene glycol monomer.

4. The multi-branched polyalkylene glycol polymer according to claim 1, wherein the organic residue contains a sulfur atom.

5. The multi-branched polyalkylene glycol polymer according to claim 4, wherein the organic residue further contains a carbonyl group or an amido group.

6. The multi-branched polyalkylene glycol polymer according to claim 1, wherein the multi-branched polyalkylene glycol polymer has a structure derived from a thiol compound having a polyalkylene glycol chain.

7. The multi-branched polyalkylene glycol polymer according to claim 6, wherein the structure derived from a thiol compound having a polyalkylene glycol chain is a structure in which at least one end of the polyalkylene glycol chain bonds to a mercapto group via a group having a carbonyl group.

8. The multi-branched polyalkylene glycol polymer according to claim 7, wherein at least one unit of the polyalkylene glycol chain on the end at the side of the group having a carbonyl group is an oxyalkylene group having three or more carbon atoms, or the group having a carbonyl group has a carbonyl group and a tertiary or quaternary carbon atom bonded to the carbonyl group.

9. A method for producing the multi-branched polyalkylene glycol polymer according to claim 1, the method comprising the step of:
   polymerizing vinyl monomer components in the presence of a compound having a polyalkylene glycol chain represented by formula (3):

[Chem. 1]

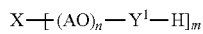   (3)

wherein X is a residue of a compound having three or more active hydrogen atoms; each AO is a C2-C18 oxyalkylene group, and the AOs may be the same as or different from each other; each $Y^1$ is a direct bond or an organic residue; each n is an average number of moles of oxyalkylene groups added and is 5 to 1,000, and the ns may be the same as or different from each other; and m is an integer of 3 to 50.

10. The method for producing the multi-branched polyalkylene glycol polymer according to claim 9, wherein a carbon radical generator is used in the polymerizing step.

11. A dispersant, comprising the multi-branched polyalkylene glycol polymer according to claim 1.

12. An admixture for cement, comprising the multi-branched polyalkylene glycol polymer according to claim 1.

13. A cement composition, comprising the multi-branched polyalkylene glycol polymer according claim 1.

14. The multi-branched polyalkylene glycol polymer according to claim 2, wherein the vinyl monomer component contains an unsaturated polyalkylene glycol monomer.

15. The multi-branched polyalkylene glycol polymer according to claim 2, wherein the organic residue contains a sulfur atom.

16. The multi-branched polyalkylene glycol polymer according to claim 3, wherein the organic residue contains a sulfur atom.

17. The multi-branched polyalkylene glycol polymer according to claim 1, wherein the polymer has a structure represented by the following formula (2):

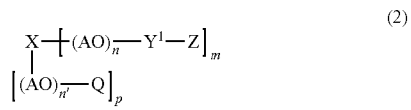   (2)

wherein X, AO, $Y^1$, Z, n, and m are the same as those recited in formula (1); each n' is an average number of moles of oxyalkylene groups added, is 1 to 1000, and the n's may be the same as or different from each other; and n and n' may be the same as or different from each other; each Q is a hydrogen atom, a C1-C10 alkyl group or alkylene group; p is an integer of 0 or greater, and the maximum value thereof depends on the number of active hydrogen atoms in the compound having three or more active hydrogen atoms represented by X and the value of m.

* * * * *